(12) United States Patent
Malatack et al.

(10) Patent No.: US 12,294,559 B2
(45) Date of Patent: *May 6, 2025

(54) SYSTEM AND METHOD FOR ENABLING DYNAMIC MULTI-MODAL COMMUNICATION

(71) Applicant: Twilio Inc., San Francisco, CA (US)

(72) Inventors: Patrick Malatack, San Francisco, CA (US); Thomas Wilsher, San Francisco, CA (US); Cheuk To Law, San Francisco, CA (US); Gowri Rao, San Francisco, CA (US)

(73) Assignee: Twilio Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/520,525

(22) Filed: Nov. 27, 2023

(65) Prior Publication Data

US 2024/0098049 A1 Mar. 21, 2024

Related U.S. Application Data

(63) Continuation of application No. 17/867,566, filed on Jul. 18, 2022, now Pat. No. 11,831,415, which is a
(Continued)

(51) Int. Cl.
*H04L 51/063* (2022.01)
*H04L 47/125* (2022.01)
(Continued)

(52) U.S. Cl.
CPC .......... *H04L 51/063* (2013.01); *H04L 47/125* (2013.01); *H04L 51/066* (2013.01);
(Continued)

(58) Field of Classification Search
CPC ... H04L 51/063; H04L 47/125; H04L 51/066; H04L 51/214; H04M 7/0021;
(Continued)

(56) References Cited

U.S. PATENT DOCUMENTS 5,274,700 A 12/1993 Gechter et al.
5,526,416 A 6/1996 Dezonno et al.
(Continued)

FOREIGN PATENT DOCUMENTS

DE 1684587 A1 3/1971
EP 0282126 A2 9/1988
(Continued)

OTHER PUBLICATIONS

Abu-Lebdeh M., et al., "A 3GPP 4G Evolved Packet Core-Based System Architecture for QoS-Enabled Mobile Video Surveillance Applications," Third International Conference on the Network of the Future (NOF), Nov. 21-23, 2012, pp. 1-6.
(Continued)

*Primary Examiner* — Parth Patel
(74) *Attorney, Agent, or Firm* — LOWENSTEIN SANDLER LLP

(57) ABSTRACT

A method includes receiving a first request associated with a first user account and comprising content of a first message, and a second request associated with a second user account and comprising content of a second message, generating a first list of routing options for delivering the first message to a first plurality of destination endpoints, and a second list of routing options for delivering the second message to a second plurality of destination endpoints, determining a first optimal routing option for delivering the first message, determining, a second optimal routing option for delivering the second message, causing one or more versions of the first message to be transmitted to the first plurality of destination endpoints using the first optimal routing option, and causing one or more versions of the second message to be transmitted to the second plurality of destination endpoints using the second optimal routing option.

20 Claims, 17 Drawing Sheets

Related U.S. Application Data continuation of application No. 16/054,879, filed on Aug. 3, 2018, now Pat. No. 11,394,673, which is a continuation of application No. 15/059,753, filed on Mar. 3, 2016, now Pat. No. 10,069,773, which is a continuation of application No. 14/489,371, filed on Sep. 17, 2014, now Pat. No. 9,325,624.

(60) Provisional application No. 61/902,985, filed on Nov. 12, 2013.

(51) Int. Cl.
  *H04L 51/066* (2022.01)
  *H04L 51/214* (2022.01)
  *H04M 7/00* (2006.01)
  *H04W 72/044* (2023.01)

(52) U.S. Cl.
  CPC ........ *H04L 51/214* (2022.05); *H04M 7/0021* (2013.01); *H04M 7/0024* (2013.01); *H04M 7/0048* (2013.01); *H04M 7/0051* (2013.01); *H04W 72/044* (2013.01); *H04M 7/0054* (2013.01); *H04M 2201/60* (2013.01)

(58) Field of Classification Search
  CPC ............. H04M 7/0024; H04M 7/0048; H04M 7/0051; H04W 72/044
  See application file for complete search history.

(56) References Cited

U.S. PATENT DOCUMENTS

| | | | |
|---|---|---|---|
| 5,581,608 | A | 12/1996 | Jreij et al. |
| 5,598,457 | A | 1/1997 | Foladare et al. |
| 5,867,495 | A | 2/1999 | Elliott et al. |
| 5,934,181 | A | 8/1999 | Adamczewski |
| 5,978,465 | A | 11/1999 | Corduroy et al. |
| 6,026,440 | A | 2/2000 | Shrader et al. |
| 6,034,946 | A | 3/2000 | Roginsky et al. |
| 6,094,681 | A | 7/2000 | Shaffer et al. |
| 6,112,253 | A * | 8/2000 | Gerard ............ G06F 9/52 719/315 |
| 6,138,143 | A | 10/2000 | Gigliotti et al. |
| 6,185,565 | B1 | 2/2001 | Meubus et al. |
| 6,192,123 | B1 * | 2/2001 | Grunsted ............ H04M 3/42 379/350 |
| 6,206,564 | B1 | 3/2001 | Adamczewski |
| 6,223,287 | B1 | 4/2001 | Douglas et al. |
| 6,232,979 | B1 | 5/2001 | Shochet |
| 6,269,336 | B1 | 7/2001 | Ladd et al. |
| 6,317,137 | B1 | 11/2001 | Rosasco |
| 6,363,065 | B1 | 3/2002 | Thornton et al. |
| 6,373,836 | B1 * | 4/2002 | Deryugin ............ H04M 3/5237 379/900 |
| 6,425,012 | B1 | 7/2002 | Trovato et al. |
| 6,426,995 | B1 | 7/2002 | Kim et al. |
| 6,430,175 | B1 | 8/2002 | Echols et al. |
| 6,434,528 | B1 | 8/2002 | Sanders |
| 6,445,694 | B1 | 9/2002 | Swartz |
| 6,445,776 | B1 | 9/2002 | Shank et al. |
| 6,459,913 | B2 | 10/2002 | Cloutier |
| 6,463,414 | B1 | 10/2002 | Su et al. |
| 6,493,558 | B1 | 12/2002 | Bernhart et al. |
| 6,496,500 | B2 | 12/2002 | Nance et al. |
| 6,501,739 | B1 | 12/2002 | Cohen |
| 6,501,832 | B1 | 12/2002 | Saylor et al. |
| 6,507,875 | B1 | 1/2003 | Mellen-Garnett et al. |
| 6,571,245 | B2 | 5/2003 | Huang et al. |
| 6,574,216 | B1 | 6/2003 | Farris et al. |
| 6,577,721 | B1 | 6/2003 | Vainio et al. |
| 6,600,736 | B1 | 7/2003 | Ball et al. |
| 6,606,596 | B1 | 8/2003 | Zirngibl et al. |
| 6,614,783 | B1 | 9/2003 | Sonesh et al. |
| 6,625,258 | B1 | 9/2003 | Ram et al. |
| 6,625,576 | B2 | 9/2003 | Kochanski et al. |
| 6,636,504 | B1 | 10/2003 | Albers et al. |
| 6,662,231 | B1 | 12/2003 | Drosset et al. |
| 6,704,785 | B1 | 3/2004 | Koo et al. |
| 6,707,889 | B1 | 3/2004 | Saylor et al. |
| 6,711,129 | B1 | 3/2004 | Bauer et al. |
| 6,711,249 | B2 | 3/2004 | Weissman et al. |
| 6,738,738 | B2 | 5/2004 | Henton |
| 6,757,365 | B1 | 6/2004 | Bogard |
| 6,765,997 | B1 | 7/2004 | Zirngibl et al. |
| 6,768,788 | B1 | 7/2004 | Langseth et al. |
| 6,771,955 | B2 | 8/2004 | Imura et al. |
| 6,778,653 | B1 | 8/2004 | Kallas et al. |
| 6,785,266 | B2 | 8/2004 | Swartz |
| 6,788,768 | B1 | 9/2004 | Saylor et al. |
| 6,792,086 | B1 | 9/2004 | Saylor et al. |
| 6,792,093 | B2 | 9/2004 | Barak et al. |
| 6,798,867 | B1 | 9/2004 | Zirngibl et al. |
| 6,807,529 | B2 | 10/2004 | Johnson et al. |
| 6,807,574 | B1 | 10/2004 | Partovi et al. |
| 6,819,667 | B1 | 11/2004 | Brusilovsky et al. |
| 6,820,260 | B1 | 11/2004 | Flockhart et al. |
| 6,829,334 | B1 | 12/2004 | Zirngibl et al. |
| 6,831,966 | B1 | 12/2004 | Tegan et al. |
| 6,834,265 | B2 | 12/2004 | Balasuriya |
| 6,836,537 | B1 | 12/2004 | Zirngibl et al. |
| 6,842,767 | B1 | 1/2005 | Partovi et al. |
| 6,850,603 | B1 | 2/2005 | Eberle et al. |
| 6,870,830 | B1 | 3/2005 | Schuster et al. |
| 6,873,952 | B1 | 3/2005 | Bailey et al. |
| 6,874,084 | B1 | 3/2005 | Dobner et al. |
| 6,885,737 | B1 | 4/2005 | Gao et al. |
| 6,888,929 | B1 | 5/2005 | Saylor et al. |
| 6,895,084 | B1 | 5/2005 | Saylor et al. |
| 6,898,567 | B2 | 5/2005 | Balasuriya |
| 6,912,581 | B2 | 6/2005 | Johnson et al. |
| 6,922,411 | B1 | 7/2005 | Taylor |
| 6,928,469 | B1 | 8/2005 | Duursma et al. |
| 6,931,405 | B2 | 8/2005 | El-Shimi et al. |
| 6,937,699 | B1 | 8/2005 | Schuster et al. |
| 6,940,953 | B1 | 9/2005 | Eberle et al. |
| 6,941,268 | B2 | 9/2005 | Porter et al. |
| 6,947,417 | B2 | 9/2005 | Laursen et al. |
| 6,947,988 | B1 | 9/2005 | Saleh |
| 6,961,330 | B1 | 11/2005 | Cattan et al. |
| 6,964,012 | B1 | 11/2005 | Zirngibl et al. |
| 6,970,915 | B1 | 11/2005 | Partovi et al. |
| 6,977,992 | B2 | 12/2005 | Zirngibl et al. |
| 6,981,041 | B2 | 12/2005 | Araujo et al. |
| 6,985,862 | B2 | 1/2006 | Ström et al. |
| 6,999,576 | B2 | 2/2006 | Sacra |
| 7,003,464 | B2 | 2/2006 | Ferrans et al. |
| 7,006,606 | B1 | 2/2006 | Cohen et al. |
| 7,010,586 | B1 | 3/2006 | Allavarpu et al. |
| 7,020,685 | B1 | 3/2006 | Chen et al. |
| 7,039,165 | B1 | 5/2006 | Saylor et al. |
| 7,058,181 | B2 | 6/2006 | Wright et al. |
| 7,062,709 | B2 | 6/2006 | Cheung |
| 7,065,637 | B1 | 6/2006 | Nanja |
| 7,076,037 | B1 | 7/2006 | Gonen et al. |
| 7,076,428 | B2 | 7/2006 | Anastasakos et al. |
| 7,089,310 | B1 | 8/2006 | Ellerman et al. |
| 7,099,442 | B2 | 8/2006 | Da Palma et al. |
| 7,103,003 | B2 | 9/2006 | Brueckheimer et al. |
| 7,103,171 | B1 | 9/2006 | Annadata et al. |
| 7,106,844 | B1 | 9/2006 | Holland |
| 7,111,163 | B1 | 9/2006 | Haney |
| 7,136,932 | B1 | 11/2006 | Schneider |
| 7,140,004 | B1 | 11/2006 | Kunins et al. |
| 7,143,039 | B1 | 11/2006 | Stifelman et al. |
| 7,197,331 | B2 | 3/2007 | Anastasakos et al. |
| 7,197,461 | B1 | 3/2007 | Eberle et al. |
| 7,197,462 | B2 | 3/2007 | Takagi et al. |
| 7,197,544 | B2 | 3/2007 | Wang et al. |
| D540,074 | S | 4/2007 | Peters |
| 7,225,232 | B2 | 5/2007 | Elberse |
| 7,227,849 | B1 | 6/2007 | Räsänen |
| 7,260,208 | B2 | 8/2007 | Cavalcanti |
| 7,266,181 | B1 | 9/2007 | Zirngibl et al. |

(56) References Cited

U.S. PATENT DOCUMENTS

| | | | |
|---|---|---|---|
| 7,269,557 B1 | 9/2007 | Bailey et al. | |
| 7,272,212 B2 | 9/2007 | Eberle et al. | |
| 7,272,564 B2 | 9/2007 | Phillips et al. | |
| 7,277,851 B1 | 10/2007 | Henton | |
| 7,283,515 B2 | 10/2007 | Fowler | |
| 7,283,519 B2 | 10/2007 | Girard | |
| 7,286,521 B1 | 10/2007 | Jackson et al. | |
| 7,287,248 B1 | 10/2007 | Adeeb | |
| 7,289,453 B2 | 10/2007 | Riedel et al. | |
| 7,296,739 B1 | 11/2007 | Mo et al. | |
| 7,298,732 B2 | 11/2007 | Cho | |
| 7,298,834 B1 | 11/2007 | Homeier et al. | |
| 7,308,085 B2 | 12/2007 | Weissman | |
| 7,308,408 B1 | 12/2007 | Stifelman et al. | |
| 7,324,633 B2 | 1/2008 | Gao et al. | |
| 7,324,942 B1 | 1/2008 | Mahowald et al. | |
| 7,328,263 B1 | 2/2008 | Sadjadi | |
| 7,330,463 B1 | 2/2008 | Bradd et al. | |
| 7,330,890 B1 | 2/2008 | Partovi et al. | |
| 7,340,040 B1 | 3/2008 | Saylor et al. | |
| 7,349,714 B2 | 3/2008 | Lee et al. | |
| 7,369,865 B2 | 5/2008 | Gabriel et al. | |
| 7,370,329 B2 | 5/2008 | Kumar et al. | |
| 7,373,660 B1 | 5/2008 | Guichard et al. | |
| 7,376,223 B2 | 5/2008 | Taylor et al. | |
| 7,376,586 B1 | 5/2008 | Partovi et al. | |
| 7,376,733 B2 | 5/2008 | Connelly et al. | |
| 7,376,740 B1 | 5/2008 | Porter et al. | |
| 7,412,525 B2 | 8/2008 | Cafarella et al. | |
| 7,418,090 B2 | 8/2008 | Reding et al. | |
| 7,428,302 B2 | 9/2008 | Zirngibl et al. | |
| 7,440,898 B1 | 10/2008 | Eberle et al. | |
| 7,447,299 B1 | 11/2008 | Partovi et al. | |
| 7,454,459 B1 | 11/2008 | Kapoor et al. | |
| 7,457,249 B2 | 11/2008 | Baldwin et al. | |
| 7,457,397 B1 | 11/2008 | Saylor et al. | |
| 7,473,872 B2 | 1/2009 | Takimoto | |
| 7,486,780 B2 | 2/2009 | Zirngibl et al. | |
| 7,496,054 B2 | 2/2009 | Taylor | |
| 7,496,188 B2 | 2/2009 | Saha et al. | |
| 7,496,651 B1 | 2/2009 | Joshi | |
| 7,500,047 B1 * | 3/2009 | Tyndall | H04L 69/18 710/311 |
| 7,500,249 B2 | 3/2009 | Kampe et al. | |
| 7,505,951 B2 | 3/2009 | Thompson et al. | |
| 7,519,359 B2 | 4/2009 | Chiarulli et al. | |
| 7,522,711 B1 | 4/2009 | Stein et al. | |
| 7,536,454 B2 | 5/2009 | Balasuriya | |
| 7,542,761 B2 | 6/2009 | Sarkar | |
| 7,552,054 B1 | 6/2009 | Stifelman et al. | |
| 7,571,226 B1 | 8/2009 | Partovi et al. | |
| 7,606,868 B1 | 10/2009 | Le et al. | |
| 7,613,287 B1 | 11/2009 | Stifelman et al. | |
| 7,623,648 B1 | 11/2009 | Oppenheim et al. | |
| 7,630,900 B1 | 12/2009 | Strom | |
| 7,631,310 B1 | 12/2009 | Henzinger | |
| 7,644,000 B1 | 1/2010 | Strom | |
| 7,657,433 B1 | 2/2010 | Chang | |
| 7,657,434 B2 | 2/2010 | Thompson et al. | |
| 7,668,157 B2 | 2/2010 | Weintraub et al. | |
| 7,672,275 B2 | 3/2010 | Yajnik et al. | |
| 7,672,295 B1 | 3/2010 | Andhare et al. | |
| 7,675,857 B1 | 3/2010 | Chesson | |
| 7,676,221 B2 | 3/2010 | Roundtree et al. | |
| 7,685,298 B2 | 3/2010 | Day et al. | |
| 7,715,547 B2 | 5/2010 | Ibbotson et al. | |
| 7,716,293 B2 | 5/2010 | Kasuga et al. | |
| 7,742,499 B1 | 6/2010 | Erskine et al. | |
| 7,779,065 B2 * | 8/2010 | Gupta | H04L 45/02 709/239 |
| 7,809,125 B2 | 10/2010 | Brunson et al. | |
| 7,809,791 B2 | 10/2010 | Schwartz et al. | |
| 7,875,836 B2 | 1/2011 | Imura et al. | |
| 7,882,253 B2 | 2/2011 | Pardo-Castellote et al. | |
| 7,912,983 B1 * | 3/2011 | Ward | H04L 45/308 709/227 |
| 7,920,866 B2 | 4/2011 | Bosch et al. | |
| 7,926,099 B1 | 4/2011 | Chakravarty et al. | |
| 7,929,562 B2 | 4/2011 | Petrovykh | |
| 7,936,867 B1 | 5/2011 | Hill et al. | |
| 7,949,111 B2 | 5/2011 | Harlow et al. | |
| 7,962,644 B1 | 6/2011 | Ezerzer et al. | |
| 7,979,555 B2 | 7/2011 | Rothstein et al. | |
| 7,992,120 B1 | 8/2011 | Wang et al. | |
| 8,023,425 B2 | 9/2011 | Raleigh | |
| 8,024,785 B2 | 9/2011 | Andress et al. | |
| 8,045,689 B2 | 10/2011 | Provenzale et al. | |
| 8,046,378 B1 | 10/2011 | Zhuge et al. | |
| 8,046,823 B1 | 10/2011 | Begen et al. | |
| 8,069,096 B1 | 11/2011 | Ballaro et al. | |
| 8,078,483 B1 | 12/2011 | Hirose et al. | |
| 8,081,744 B2 | 12/2011 | Sylvain | |
| 8,081,958 B2 * | 12/2011 | Soderstrom | H04L 67/14 379/202.01 |
| 8,103,725 B2 | 1/2012 | Gupta et al. | |
| 8,126,128 B1 | 2/2012 | Hicks, III et al. | |
| 8,126,129 B1 | 2/2012 | McGuire | |
| 8,130,712 B1 * | 3/2012 | Bennett, III | H04L 67/143 370/329 |
| 8,130,750 B2 * | 3/2012 | Hester | H04M 7/0027 370/352 |
| 8,130,917 B2 | 3/2012 | Helbling et al. | |
| 8,139,730 B2 | 3/2012 | Da Palma et al. | |
| 8,145,212 B2 | 3/2012 | Lopresti et al. | |
| 8,149,716 B2 | 4/2012 | Ramanathan et al. | |
| 8,150,918 B1 | 4/2012 | Edelman et al. | |
| 8,156,213 B1 | 4/2012 | Deng et al. | |
| 8,165,116 B2 | 4/2012 | Ku et al. | |
| 8,166,185 B2 | 4/2012 | Samuel et al. | |
| 8,169,936 B2 | 5/2012 | Koren et al. | |
| 8,175,007 B2 | 5/2012 | Jain et al. | |
| 8,185,619 B1 | 5/2012 | Maiocco et al. | |
| 8,196,133 B2 | 6/2012 | Kakumani et al. | |
| 8,204,479 B2 | 6/2012 | Vendrow et al. | |
| 8,214,868 B2 | 7/2012 | Hamilton et al. | |
| 8,218,457 B2 | 7/2012 | Malhotra et al. | |
| 8,233,611 B1 | 7/2012 | Zettner | |
| 8,238,533 B2 | 8/2012 | Blackwell et al. | |
| 8,243,889 B2 | 8/2012 | Taylor et al. | |
| 8,249,552 B1 | 8/2012 | Gailloux et al. | |
| 8,266,327 B2 | 9/2012 | Kumar et al. | |
| 8,295,272 B2 | 10/2012 | Boni et al. | |
| 8,301,117 B2 | 10/2012 | Keast et al. | |
| 8,306,021 B2 | 11/2012 | Lawson et al. | |
| 8,315,198 B2 | 11/2012 | Corneille et al. | |
| 8,315,369 B2 | 11/2012 | Lawson et al. | |
| 8,315,620 B1 | 11/2012 | Williamson et al. | |
| 8,319,816 B1 | 11/2012 | Swanson et al. | |
| 8,325,906 B2 * | 12/2012 | Fullarton | H04M 3/436 379/211.01 |
| 8,326,805 B1 | 12/2012 | Arous et al. | |
| 8,335,852 B2 | 12/2012 | Hokimoto | |
| 8,346,630 B1 | 1/2013 | McKeown | |
| 8,355,394 B2 | 1/2013 | Taylor et al. | |
| 8,411,669 B2 | 4/2013 | Chen et al. | |
| 8,413,247 B2 | 4/2013 | Hudis et al. | |
| 8,417,817 B1 | 4/2013 | Jacobs | |
| 8,429,827 B2 | 4/2013 | Wetzel | |
| 8,438,315 B1 | 5/2013 | Tao et al. | |
| 8,462,670 B2 | 6/2013 | Chien et al. | |
| 8,467,502 B2 | 6/2013 | Sureka et al. | |
| 8,477,926 B2 | 7/2013 | Jasper et al. | |
| 8,503,639 B2 | 8/2013 | Reding et al. | |
| 8,503,643 B2 * | 8/2013 | McKee | H04L 67/52 379/142.1 |
| 8,503,650 B2 | 8/2013 | Reding et al. | |
| 8,504,818 B2 | 8/2013 | Rao et al. | |
| 8,509,068 B2 | 8/2013 | Begall et al. | |
| 8,532,686 B2 | 9/2013 | Schmidt et al. | |
| 8,533,857 B2 | 9/2013 | Tuchman et al. | |
| 8,542,805 B2 | 9/2013 | Agranovsky et al. | |
| 8,543,665 B2 | 9/2013 | Ansari et al. | |
| 8,547,962 B2 | 10/2013 | Ramachandran et al. | |

(56) References Cited

U.S. PATENT DOCUMENTS

| | | | |
|---|---|---|---|
| 8,549,047 B2 | 10/2013 | Beechuk et al. |
| 8,565,117 B2 | 10/2013 | Hilt et al. |
| 8,572,391 B2 | 10/2013 | Golan et al. |
| 8,576,712 B2 | 11/2013 | Sabat et al. |
| 8,577,803 B2 | 11/2013 | Chatterjee et al. |
| 8,582,450 B1 | 11/2013 | Robesky |
| 8,582,737 B2* | 11/2013 | Lawson ............... H04M 15/68 |
| | | | 379/114.03 |
| 8,594,626 B1* | 11/2013 | Woodson .......... H04M 15/8355 |
| | | | 379/114.03 |
| 8,601,136 B1 | 12/2013 | Fahlgren et al. |
| 8,611,338 B2 | 12/2013 | Lawson et al. |
| 8,613,102 B2 | 12/2013 | Nath |
| 8,638,781 B2* | 1/2014 | Lawson ............... H04L 65/1046 |
| | | | 709/227 |
| 8,649,268 B2 | 2/2014 | Lawson et al. |
| 8,656,452 B2 | 2/2014 | Li et al. |
| 8,667,056 B1 | 3/2014 | Proulx et al. |
| 8,670,320 B2* | 3/2014 | Eswaran ................ H04L 45/54 |
| | | | 370/401 |
| 8,675,493 B2 | 3/2014 | Buddhikot et al. |
| 8,688,147 B2 | 4/2014 | Nguyen et al. |
| 8,695,077 B1 | 4/2014 | Gerhard et al. |
| 8,713,693 B2 | 4/2014 | Shanabrook et al. |
| 8,728,656 B2 | 5/2014 | Takahashi et al. |
| 8,751,801 B2 | 6/2014 | Harris et al. |
| 8,755,376 B2 | 6/2014 | Lawson et al. |
| 8,767,925 B2 | 7/2014 | Sureka et al. |
| 8,781,975 B2 | 7/2014 | Bennett et al. |
| 8,797,920 B2 | 8/2014 | Parreira |
| 8,806,024 B1 | 8/2014 | Toba Francis et al. |
| 8,819,133 B2 | 8/2014 | Wang |
| 8,825,746 B2 | 9/2014 | Ravichandran et al. |
| 8,837,465 B2 | 9/2014 | Lawson et al. |
| 8,838,707 B2 | 9/2014 | Lawson et al. |
| 8,843,596 B2 | 9/2014 | Goel et al. |
| 8,855,271 B2 | 10/2014 | Brock et al. |
| 8,861,510 B1 | 10/2014 | Fritz |
| 8,879,547 B2 | 11/2014 | Maes |
| 8,903,938 B2 | 12/2014 | Vermeulen et al. |
| 8,918,848 B2 | 12/2014 | Sharma et al. |
| 8,924,489 B2 | 12/2014 | Bleau et al. |
| 8,938,053 B2 | 1/2015 | Cooke et al. |
| 8,948,356 B2 | 2/2015 | Nowack et al. |
| 8,954,591 B2 | 2/2015 | Ganesan et al. |
| 8,964,726 B2 | 2/2015 | Lawson et al. |
| 8,990,610 B2 | 3/2015 | Bostick et al. |
| 9,014,664 B2 | 4/2015 | Kim et al. |
| 9,015,702 B2 | 4/2015 | Bhat |
| 9,031,223 B2 | 5/2015 | Smith et al. |
| 9,071,677 B2 | 6/2015 | Aggarwal et al. |
| 9,106,599 B2 | 8/2015 | Dandison et al. |
| 9,137,127 B2 | 9/2015 | Nowack et al. |
| 9,141,682 B1 | 9/2015 | Adoc, Jr. et al. |
| 9,161,296 B2 | 10/2015 | Parsons et al. |
| 9,177,007 B2 | 11/2015 | Winters et al. |
| 9,204,281 B2 | 12/2015 | Ramprasad et al. |
| 9,210,275 B2 | 12/2015 | Lawson et al. |
| 9,225,840 B2* | 12/2015 | Malatack ............ H04L 65/1059 |
| 9,247,062 B2* | 1/2016 | Fahlgren ............... H04M 3/523 |
| 9,294,499 B2* | 3/2016 | Kiessling .............. H04L 63/18 |
| 9,306,982 B2 | 4/2016 | Lawson et al. |
| 9,307,094 B2 | 4/2016 | Nowack et al. |
| 9,325,624 B2* | 4/2016 | Malatack ............. H04L 51/063 |
| 9,338,064 B2* | 5/2016 | Stratton ............... G06F 9/5072 |
| 9,344,573 B2 | 5/2016 | Wolthuis et al. |
| 9,356,916 B2 | 5/2016 | Kravitz et al. |
| 9,378,337 B2 | 6/2016 | Kuhr |
| 9,398,622 B2 | 7/2016 | Lawson et al. |
| 9,456,008 B2 | 9/2016 | Lawson et al. |
| 9,456,339 B1 | 9/2016 | Hildner et al. |
| 9,460,169 B2 | 10/2016 | Hinton et al. |
| 9,596,274 B2* | 3/2017 | Lawson ................. H04L 67/02 |
| 9,628,624 B2 | 4/2017 | Wolthuis et al. |
| 9,632,875 B2 | 4/2017 | Raichstein et al. |
| 9,634,995 B2 | 4/2017 | Binder |
| 9,654,647 B2* | 5/2017 | Nowack ............. H04M 15/8044 |
| 9,894,019 B2 | 2/2018 | Dandison et al. |
| 10,057,775 B2* | 8/2018 | Raleigh ................ H04M 15/64 |
| 10,069,773 B2 | 9/2018 | Malatack et al. |
| 10,291,486 B2* | 5/2019 | Fu ............................. G06F 8/71 |
| 10,826,981 B2* | 11/2020 | Vano Newman ..... H04L 47/745 |
| 11,399,339 B2* | 7/2022 | Boerjesson ........... H04W 48/18 |
| 11,637,934 B2* | 4/2023 | Lawson ............. H04M 15/8278 |
| | | | 455/406 |
| 11,831,415 B2* | 11/2023 | Malatack ............. H04L 51/066 |
| 2001/0038624 A1 | 11/2001 | Greenberg et al. |
| 2001/0043684 A1 | 11/2001 | Guedalia et al. |
| 2001/0051996 A1 | 12/2001 | Cooper et al. |
| 2002/0006124 A1 | 1/2002 | Jimenez et al. |
| 2002/0006125 A1 | 1/2002 | Josse et al. |
| 2002/0006193 A1 | 1/2002 | Rodenbusch et al. |
| 2002/0025819 A1* | 2/2002 | Cetusic ................ H04M 3/5183 |
| | | | 455/450 |
| 2002/0057777 A1 | 5/2002 | Saito et al. |
| 2002/0064267 A1 | 5/2002 | Martin et al. |
| 2002/0067823 A1 | 6/2002 | Walker et al. |
| 2002/0077833 A1 | 6/2002 | Arons et al. |
| 2002/0126813 A1 | 9/2002 | Partovi et al. |
| 2002/0133587 A1 | 9/2002 | Ensel et al. |
| 2002/0136391 A1 | 9/2002 | Armstrong |
| 2002/0150092 A1* | 10/2002 | Bontempi ........... H04L 65/1104 |
| | | | 370/328 |
| 2002/0165957 A1 | 11/2002 | Devoe et al. |
| 2002/0176378 A1 | 11/2002 | Hamilton et al. |
| 2002/0184361 A1 | 12/2002 | Eden |
| 2002/0198941 A1 | 12/2002 | Gavrilescu et al. |
| 2003/0006137 A1 | 1/2003 | Wei et al. |
| 2003/0012356 A1 | 1/2003 | Zino et al. |
| 2003/0014665 A1 | 1/2003 | Anderson et al. |
| 2003/0018830 A1 | 1/2003 | Chen et al. |
| 2003/0023672 A1 | 1/2003 | Vaysman |
| 2003/0026426 A1 | 2/2003 | Wright et al. |
| 2003/0046366 A1 | 3/2003 | Pardikar et al. |
| 2003/0051037 A1 | 3/2003 | Sundaram et al. |
| 2003/0058884 A1 | 3/2003 | Kallner et al. |
| 2003/0059020 A1 | 3/2003 | Meyerson et al. |
| 2003/0060188 A1 | 3/2003 | Gidron et al. |
| 2003/0061317 A1 | 3/2003 | Brown et al. |
| 2003/0061404 A1 | 3/2003 | Atwal et al. |
| 2003/0088421 A1 | 5/2003 | Maes et al. |
| 2003/0097330 A1 | 5/2003 | Hillmer et al. |
| 2003/0097447 A1 | 5/2003 | Johnston |
| 2003/0097639 A1 | 5/2003 | Niyogi et al. |
| 2003/0103620 A1 | 6/2003 | Brown et al. |
| 2003/0123640 A1 | 7/2003 | Roelle et al. |
| 2003/0149721 A1 | 8/2003 | Alfonso-Nogueiro et al. |
| 2003/0162506 A1* | 8/2003 | Toshimitsu ............. H04L 1/0003 |
| | | | 455/452.2 |
| 2003/0169730 A1* | 9/2003 | Narasimhan .......... H04L 51/214 |
| | | | 370/360 |
| 2003/0195950 A1 | 10/2003 | Huang et al. |
| 2003/0195990 A1 | 10/2003 | Greenblat |
| 2003/0196076 A1 | 10/2003 | Zabarski et al. |
| 2003/0204616 A1 | 10/2003 | Billhartz et al. |
| 2003/0211842 A1 | 11/2003 | Kempf et al. |
| 2003/0231647 A1 | 12/2003 | Petrovykh |
| 2003/0233276 A1 | 12/2003 | Pearlman et al. |
| 2004/0008635 A1 | 1/2004 | Nelson et al. |
| 2004/0011690 A1 | 1/2004 | Marfino et al. |
| 2004/0044953 A1 | 3/2004 | Watkins et al. |
| 2004/0052349 A1 | 3/2004 | Creamer et al. |
| 2004/0071275 A1 | 4/2004 | Bowater et al. |
| 2004/0101122 A1 | 5/2004 | Da, et al. |
| 2004/0102182 A1 | 5/2004 | Reith et al. |
| 2004/0117788 A1 | 6/2004 | Karaoguz et al. |
| 2004/0136324 A1 | 7/2004 | Steinberg et al. |
| 2004/0165569 A1 | 8/2004 | Sweatman et al. |
| 2004/0172482 A1 | 9/2004 | Weissman et al. |
| 2004/0199572 A1 | 10/2004 | Hunt et al. |
| 2004/0205101 A1 | 10/2004 | Radhakrishnan |
| 2004/0205689 A1* | 10/2004 | Ellens ................ G06Q 10/0637 |
| | | | 717/100 |
| 2004/0213400 A1 | 10/2004 | Golitsin et al. |

(56) References Cited

U.S. PATENT DOCUMENTS

| | | |
|---|---|---|
| 2004/0216058 A1 | 10/2004 | Chavers et al. |
| 2004/0218748 A1 | 11/2004 | Fisher |
| 2004/0228469 A1 | 11/2004 | Andrews et al. |
| 2004/0236696 A1 | 11/2004 | Aoki et al. |
| 2004/0240649 A1* | 12/2004 | Goel .................. H04M 15/59 379/114.01 |
| 2005/0005109 A1 | 1/2005 | Castaldi et al. |
| 2005/0005200 A1 | 1/2005 | Matena et al. |
| 2005/0010483 A1 | 1/2005 | Ling |
| 2005/0015505 A1 | 1/2005 | Kruis et al. |
| 2005/0021626 A1 | 1/2005 | Prajapat et al. |
| 2005/0025303 A1 | 2/2005 | Hostetler |
| 2005/0038772 A1 | 2/2005 | Colrain |
| 2005/0043952 A1 | 2/2005 | Sharma et al. |
| 2005/0047579 A1 | 3/2005 | Salame |
| 2005/0060411 A1 | 3/2005 | Coulombe et al. |
| 2005/0083907 A1 | 4/2005 | Fishler |
| 2005/0091336 A1 | 4/2005 | Dehamer et al. |
| 2005/0091572 A1 | 4/2005 | Gavrilescu et al. |
| 2005/0108770 A1 | 5/2005 | Karaoguz et al. |
| 2005/0125251 A1 | 6/2005 | Berger et al. |
| 2005/0125739 A1 | 6/2005 | Thompson et al. |
| 2005/0128961 A1 | 6/2005 | Miloslavsky et al. |
| 2005/0135578 A1 | 6/2005 | Ress et al. |
| 2005/0141500 A1 | 6/2005 | Bhandari et al. |
| 2005/0147088 A1 | 7/2005 | Bao et al. |
| 2005/0177635 A1 | 8/2005 | Schmidt et al. |
| 2005/0181835 A1 | 8/2005 | Lau et al. |
| 2005/0198292 A1 | 9/2005 | Duursma et al. |
| 2005/0228680 A1 | 10/2005 | Malik |
| 2005/0238153 A1 | 10/2005 | Chevalier |
| 2005/0240659 A1 | 10/2005 | Taylor |
| 2005/0243977 A1 | 11/2005 | Creamer et al. |
| 2005/0246176 A1 | 11/2005 | Creamer et al. |
| 2005/0289222 A1 | 12/2005 | Sahim |
| 2006/0008065 A1 | 1/2006 | Longman et al. |
| 2006/0008073 A1 | 1/2006 | Yoshizawa et al. |
| 2006/0008256 A1 | 1/2006 | Khedouri et al. |
| 2006/0015467 A1 | 1/2006 | Morken et al. |
| 2006/0021004 A1 | 1/2006 | Moran et al. |
| 2006/0023676 A1 | 2/2006 | Whitmore et al. |
| 2006/0047666 A1 | 3/2006 | Bedi et al. |
| 2006/0067506 A1 | 3/2006 | Flockhart et al. |
| 2006/0080415 A1 | 4/2006 | Tu |
| 2006/0098624 A1 | 5/2006 | Morgan et al. |
| 2006/0129638 A1 | 6/2006 | Deakin |
| 2006/0143007 A1 | 6/2006 | Koh et al. |
| 2006/0146792 A1 | 7/2006 | Ramachandran et al. |
| 2006/0146802 A1 | 7/2006 | Baldwin et al. |
| 2006/0168334 A1 | 7/2006 | Potti et al. |
| 2006/0203979 A1 | 9/2006 | Jennings |
| 2006/0209695 A1 | 9/2006 | Archer, Jr. et al. |
| 2006/0212865 A1 | 9/2006 | Mncent et al. |
| 2006/0215824 A1 | 9/2006 | Mitby et al. |
| 2006/0217823 A1 | 9/2006 | Hussey |
| 2006/0217978 A1 | 9/2006 | Mitby et al. |
| 2006/0222166 A1 | 10/2006 | Ramakrishna et al. |
| 2006/0235715 A1 | 10/2006 | Abrams et al. |
| 2006/0256816 A1 | 11/2006 | Yarlagadda et al. |
| 2006/0262915 A1 | 11/2006 | Marascio et al. |
| 2006/0270386 A1 | 11/2006 | Yu et al. |
| 2006/0285489 A1 | 12/2006 | Francisco et al. |
| 2007/0002744 A1 | 1/2007 | Mewhinney et al. |
| 2007/0036143 A1 | 2/2007 | Alt et al. |
| 2007/0038499 A1 | 2/2007 | Margulies et al. |
| 2007/0043681 A1 | 2/2007 | Morgan et al. |
| 2007/0050306 A1 | 3/2007 | McQueen |
| 2007/0064672 A1 | 3/2007 | Raghav et al. |
| 2007/0070906 A1 | 3/2007 | Thakur |
| 2007/0070980 A1 | 3/2007 | Phelps et al. |
| 2007/0071223 A1 | 3/2007 | Lee et al. |
| 2007/0074174 A1 | 3/2007 | Thornton |
| 2007/0088836 A1 | 4/2007 | Tai et al. |
| 2007/0091907 A1 | 4/2007 | Seshadri et al. |
| 2007/0107048 A1 | 5/2007 | Halls et al. |
| 2007/0112574 A1 | 5/2007 | Greene |
| 2007/0116191 A1 | 5/2007 | Bermudez et al. |
| 2007/0121651 A1 | 5/2007 | Casey et al. |
| 2007/0127691 A1 | 6/2007 | Lert, Jr. |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0147351 A1 | 6/2007 | Dietrich et al. |
| 2007/0149166 A1 | 6/2007 | Turcotte et al. |
| 2007/0153711 A1 | 7/2007 | Dykas et al. |
| 2007/0167170 A1 | 7/2007 | Fitchett et al. |
| 2007/0192629 A1 | 8/2007 | Saito |
| 2007/0201448 A1 | 8/2007 | Baird et al. |
| 2007/0208862 A1 | 9/2007 | Fox et al. |
| 2007/0232284 A1 | 10/2007 | Mason et al. |
| 2007/0239761 A1 | 10/2007 | Baio et al. |
| 2007/0242626 A1 | 10/2007 | Altberg et al. |
| 2007/0255828 A1 | 11/2007 | Paradise |
| 2007/0265073 A1 | 11/2007 | Novi et al. |
| 2007/0286180 A1 | 12/2007 | Marquette et al. |
| 2007/0291734 A1 | 12/2007 | Bhatia et al. |
| 2007/0291905 A1 | 12/2007 | Halliday et al. |
| 2007/0293200 A1 | 12/2007 | Roundtree et al. |
| 2007/0295803 A1 | 12/2007 | Levine et al. |
| 2008/0005275 A1 | 1/2008 | Overton et al. |
| 2008/0025320 A1 | 1/2008 | Bangalore et al. |
| 2008/0037715 A1 | 2/2008 | Prozeniuk et al. |
| 2008/0037746 A1 | 2/2008 | Dufrene et al. |
| 2008/0040484 A1 | 2/2008 | Yardley |
| 2008/0049617 A1 | 2/2008 | Grice et al. |
| 2008/0052395 A1 | 2/2008 | Wright et al. |
| 2008/0091843 A1 | 4/2008 | Kulkarni |
| 2008/0098062 A1* | 4/2008 | Balia .................. G06F 16/9535 709/203 |
| 2008/0101571 A1 | 5/2008 | Harlow et al. |
| 2008/0104348 A1 | 5/2008 | Kabzinski et al. |
| 2008/0120702 A1 | 5/2008 | Hokimoto |
| 2008/0123559 A1 | 5/2008 | Haviv et al. |
| 2008/0134049 A1 | 6/2008 | Gupta et al. |
| 2008/0139166 A1 | 6/2008 | Agarwal et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0155029 A1 | 6/2008 | Helbling et al. |
| 2008/0162482 A1 | 7/2008 | Ahern et al. |
| 2008/0165708 A1 | 7/2008 | Moore et al. |
| 2008/0172404 A1 | 7/2008 | Cohen |
| 2008/0177883 A1 | 7/2008 | Hanai et al. |
| 2008/0192736 A1 | 8/2008 | Jabri et al. |
| 2008/0201426 A1 | 8/2008 | Darcie |
| 2008/0209050 A1 | 8/2008 | Li |
| 2008/0212945 A1 | 9/2008 | Khedouri et al. |
| 2008/0222656 A1 | 9/2008 | Lyman |
| 2008/0229421 A1 | 9/2008 | Hudis et al. |
| 2008/0232574 A1 | 9/2008 | Baluja et al. |
| 2008/0235230 A1 | 9/2008 | Maes |
| 2008/0256224 A1 | 10/2008 | Kaji et al. |
| 2008/0262994 A1* | 10/2008 | Berry .................. G06Q 30/02 |
| 2008/0275741 A1 | 11/2008 | Loeffen |
| 2008/0307436 A1 | 12/2008 | Hamilton |
| 2008/0310599 A1 | 12/2008 | Purnadi et al. |
| 2008/0313318 A1 | 12/2008 | Vermeulen et al. |
| 2008/0316931 A1 | 12/2008 | Qiu et al. |
| 2008/0317222 A1 | 12/2008 | Griggs et al. |
| 2008/0317232 A1 | 12/2008 | Couse et al. |
| 2008/0317233 A1 | 12/2008 | Rey et al. |
| 2009/0046838 A1 | 2/2009 | Andreasson |
| 2009/0052437 A1 | 2/2009 | Taylor et al. |
| 2009/0052641 A1 | 2/2009 | Taylor et al. |
| 2009/0059894 A1 | 3/2009 | Jackson et al. |
| 2009/0063502 A1 | 3/2009 | Coimbatore et al. |
| 2009/0074159 A1 | 3/2009 | Goldfarb et al. |
| 2009/0075684 A1* | 3/2009 | Cheng .................. H04W 88/16 455/466 |
| 2009/0083155 A1 | 3/2009 | Tudor et al. |
| 2009/0089165 A1 | 4/2009 | Sweeney |
| 2009/0089352 A1 | 4/2009 | Davis et al. |
| 2009/0089699 A1 | 4/2009 | Saha et al. |
| 2009/0093250 A1 | 4/2009 | Jackson et al. |

(56) References Cited

U.S. PATENT DOCUMENTS

| | | |
|---|---|---|
| 2009/0094674 A1 | 4/2009 | Schwartz et al. |
| 2009/0125608 A1 | 5/2009 | Werth et al. |
| 2009/0129573 A1 | 5/2009 | Gavan et al. |
| 2009/0136011 A1 | 5/2009 | Goel |
| 2009/0170496 A1 | 7/2009 | Bourque |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0182896 A1 | 7/2009 | Patterson et al. |
| 2009/0193433 A1 | 7/2009 | Maes |
| 2009/0216835 A1 | 8/2009 | Jain et al. |
| 2009/0217293 A1 | 8/2009 | Wolber et al. |
| 2009/0220057 A1 | 9/2009 | Waters |
| 2009/0221310 A1 | 9/2009 | Chen et al. |
| 2009/0222341 A1 | 9/2009 | Belwadi et al. |
| 2009/0225748 A1 | 9/2009 | Taylor |
| 2009/0225763 A1 | 9/2009 | Forsberg et al. |
| 2009/0228868 A1 | 9/2009 | Drukman et al. |
| 2009/0232289 A1 | 9/2009 | Drucker et al. |
| 2009/0234965 A1 | 9/2009 | Mveganandhan et al. |
| 2009/0235349 A1* | 9/2009 | Lai .................. H04L 9/3271 726/10 |
| 2009/0241135 A1 | 9/2009 | Wong et al. |
| 2009/0252159 A1 | 10/2009 | Lawson et al. |
| 2009/0276771 A1* | 11/2009 | Nickolov ............ G06Q 30/04 718/1 |
| 2009/0288012 A1 | 11/2009 | Hertel et al. |
| 2009/0288165 A1 | 11/2009 | Qiu et al. |
| 2009/0300194 A1 | 12/2009 | Ogasawara |
| 2009/0316687 A1 | 12/2009 | Kruppa |
| 2009/0318112 A1 | 12/2009 | Vasten |
| 2010/0027531 A1 | 2/2010 | Kurashima |
| 2010/0037204 A1 | 2/2010 | Lin et al. |
| 2010/0054142 A1 | 3/2010 | Moiso et al. |
| 2010/0070424 A1 | 3/2010 | Monk |
| 2010/0071053 A1 | 3/2010 | Ansari et al. |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0094758 A1 | 4/2010 | Chamberlain et al. |
| 2010/0100809 A1* | 4/2010 | Thomas .............. G06F 3/0484 709/204 |
| 2010/0103845 A1 | 4/2010 | Ulupinar et al. |
| 2010/0107222 A1 | 4/2010 | Glasser |
| 2010/0115041 A1 | 5/2010 | Hawkins et al. |
| 2010/0138501 A1 | 6/2010 | Clinton et al. |
| 2010/0142516 A1 | 6/2010 | Lawson et al. |
| 2010/0150139 A1 | 6/2010 | Lawson et al. |
| 2010/0167689 A1 | 7/2010 | Sepehri-Nik et al. |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0217837 A1 | 8/2010 | Ansari et al. |
| 2010/0217982 A1 | 8/2010 | Brown et al. |
| 2010/0232594 A1 | 9/2010 | Lawson et al. |
| 2010/0235539 A1 | 9/2010 | Carter et al. |
| 2010/0250946 A1 | 9/2010 | Korte et al. |
| 2010/0251329 A1 | 9/2010 | Wei |
| 2010/0251340 A1 | 9/2010 | Martin et al. |
| 2010/0265825 A1 | 10/2010 | Blair et al. |
| 2010/0281108 A1 | 11/2010 | Cohen |
| 2010/0291910 A1 | 11/2010 | Sanding et al. |
| 2010/0299437 A1 | 11/2010 | Moore |
| 2010/0312919 A1 | 12/2010 | Lee et al. |
| 2010/0330971 A1* | 12/2010 | Selitser ................ H04L 67/34 455/418 |
| 2010/0332852 A1 | 12/2010 | Vembu et al. |
| 2011/0019552 A1* | 1/2011 | Karaoguz ........... H04L 45/123 370/236 |
| 2011/0019669 A1* | 1/2011 | Ma ...................... H04L 45/74 370/389 |
| 2011/0026516 A1 | 2/2011 | Roberts et al. |
| 2011/0029882 A1 | 2/2011 | Jaisinghani |
| 2011/0029981 A1 | 2/2011 | Jaisinghani |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083069 A1 | 4/2011 | Paul et al. |
| 2011/0083179 A1 | 4/2011 | Lawson et al. |
| 2011/0093516 A1 | 4/2011 | Geng et al. |
| 2011/0096673 A1 | 4/2011 | Stevenson et al. |
| 2011/0110366 A1 | 5/2011 | Moore et al. |
| 2011/0131293 A1 | 6/2011 | Mori |
| 2011/0138453 A1 | 6/2011 | Verma et al. |
| 2011/0143714 A1 | 6/2011 | Keast et al. |
| 2011/0145049 A1 | 6/2011 | Hertel et al. |
| 2011/0149810 A1 | 6/2011 | Koren et al. |
| 2011/0149950 A1* | 6/2011 | Petit-Huguenin ... H04M 7/0084 370/352 |
| 2011/0151884 A1 | 6/2011 | Zhao |
| 2011/0158235 A1 | 6/2011 | Senga |
| 2011/0167172 A1 | 7/2011 | Roach et al. |
| 2011/0170505 A1 | 7/2011 | Rajasekar et al. |
| 2011/0176537 A1 | 7/2011 | Lawson et al. |
| 2011/0179126 A1* | 7/2011 | Wetherell ............. H04W 24/10 709/206 |
| 2011/0208822 A1* | 8/2011 | Rathod ................ G06Q 30/02 709/206 |
| 2011/0211679 A1 | 9/2011 | Mezhibovsky et al. |
| 2011/0251921 A1 | 10/2011 | Kassaei et al. |
| 2011/0253693 A1 | 10/2011 | Lyons et al. |
| 2011/0255675 A1 | 10/2011 | Jasper et al. |
| 2011/0258432 A1 | 10/2011 | Rao et al. |
| 2011/0265168 A1 | 10/2011 | Lucovsky et al. |
| 2011/0265172 A1 | 10/2011 | Sharma et al. |
| 2011/0267985 A1 | 11/2011 | Wilkinson et al. |
| 2011/0274111 A1 | 11/2011 | Narasappa et al. |
| 2011/0276892 A1 | 11/2011 | Jensen-Horne et al. |
| 2011/0276951 A1 | 11/2011 | Jain |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0289162 A1* | 11/2011 | Furlong ................ H04L 51/212 709/206 |
| 2011/0299672 A1 | 12/2011 | Chiu et al. |
| 2011/0310902 A1 | 12/2011 | Xu |
| 2011/0313950 A1 | 12/2011 | Nuggehalli et al. |
| 2011/0320449 A1 | 12/2011 | Gudlavenkatasiva |
| 2011/0320550 A1 | 12/2011 | Lawson et al. |
| 2012/0000903 A1 | 1/2012 | Baarman et al. |
| 2012/0011274 A1 | 1/2012 | Moreman |
| 2012/0017222 A1 | 1/2012 | May |
| 2012/0023531 A1 | 1/2012 | Meuninck et al. |
| 2012/0023544 A1 | 1/2012 | Li et al. |
| 2012/0027228 A1 | 2/2012 | Rijken et al. |
| 2012/0028602 A1 | 2/2012 | Lisi et al. |
| 2012/0036574 A1 | 2/2012 | Heithcock et al. |
| 2012/0039202 A1 | 2/2012 | Song |
| 2012/0059709 A1 | 3/2012 | Lieberman et al. |
| 2012/0079066 A1 | 3/2012 | Li et al. |
| 2012/0083266 A1 | 4/2012 | Vanswol et al. |
| 2012/0089572 A1 | 4/2012 | Raichstein et al. |
| 2012/0094637 A1 | 4/2012 | Jeyaseelan et al. |
| 2012/0101952 A1 | 4/2012 | Raleigh et al. |
| 2012/0110564 A1 | 5/2012 | Ran et al. |
| 2012/0114112 A1 | 5/2012 | Rauschenberger et al. |
| 2012/0149404 A1* | 6/2012 | Beattie, Jr. ........... H04W 4/12 455/507 |
| 2012/0166488 A1 | 6/2012 | Kaushik et al. |
| 2012/0170726 A1 | 7/2012 | Schwartz |
| 2012/0173610 A1* | 7/2012 | Bleau .................. H04L 67/55 709/203 |
| 2012/0174095 A1 | 7/2012 | Natchadalingam et al. |
| 2012/0179646 A1 | 7/2012 | Hinton et al. |
| 2012/0179907 A1 | 7/2012 | Byrd et al. |
| 2012/0180021 A1 | 7/2012 | Byrd et al. |
| 2012/0180029 A1 | 7/2012 | Hill et al. |
| 2012/0185561 A1 | 7/2012 | Klein et al. |
| 2012/0198004 A1 | 8/2012 | Watte |
| 2012/0201238 A1* | 8/2012 | Lawson ............... H04L 65/4053 370/352 |
| 2012/0208495 A1 | 8/2012 | Lawson et al. |

(56) References Cited

U.S. PATENT DOCUMENTS

| | | |
|---|---|---|
| 2012/0221603 A1 | 8/2012 | Kothule et al. |
| 2012/0226579 A1 | 9/2012 | Ha et al. |
| 2012/0239757 A1 | 9/2012 | Firstenberg et al. |
| 2012/0240226 A1 | 9/2012 | Li |
| 2012/0246273 A1 | 9/2012 | Bornstein et al. |
| 2012/0254828 A1 | 10/2012 | Aiylam et al. |
| 2012/0281536 A1* | 11/2012 | Gell ............... H04W 28/06 370/235 |
| 2012/0288082 A1 | 11/2012 | Segall |
| 2012/0290706 A1 | 11/2012 | Lin et al. |
| 2012/0304245 A1 | 11/2012 | Lawson et al. |
| 2012/0304275 A1 | 11/2012 | Ji et al. |
| 2012/0316809 A1 | 12/2012 | Egolf et al. |
| 2012/0321058 A1* | 12/2012 | Eng ............... H04L 43/0829 379/90.01 |
| 2012/0321070 A1 | 12/2012 | Smith et al. |
| 2013/0029629 A1 | 1/2013 | Lindholm et al. |
| 2013/0031158 A1 | 1/2013 | Salsburg |
| 2013/0031613 A1 | 1/2013 | Shanabrook et al. |
| 2013/0036476 A1 | 2/2013 | Roever et al. |
| 2013/0047232 A1 | 2/2013 | Tuchman et al. |
| 2013/0054517 A1 | 2/2013 | Beechuk et al. |
| 2013/0054684 A1 | 2/2013 | Brazier et al. |
| 2013/0058262 A1 | 3/2013 | Parreira |
| 2013/0060961 A1* | 3/2013 | Wall ............... H04L 12/5691 709/238 |
| 2013/0067232 A1 | 3/2013 | Cheung et al. |
| 2013/0067448 A1 | 3/2013 | Sannidhanam et al. |
| 2013/0097298 A1 | 4/2013 | Ting et al. |
| 2013/0110658 A1 | 5/2013 | Lyman et al. |
| 2013/0132573 A1 | 5/2013 | Lindblom |
| 2013/0139148 A1 | 5/2013 | Berg et al. |
| 2013/0156024 A1 | 6/2013 | Burg |
| 2013/0163409 A1* | 6/2013 | Ellison ............... H04L 47/15 370/263 |
| 2013/0166580 A1 | 6/2013 | Maharajh et al. |
| 2013/0179942 A1 | 7/2013 | Caplis et al. |
| 2013/0201909 A1 | 8/2013 | Bosch et al. |
| 2013/0204786 A1 | 8/2013 | Mattes et al. |
| 2013/0212603 A1 | 8/2013 | Cooke et al. |
| 2013/0215465 A1* | 8/2013 | Mutsuno ............ H04N 1/32694 358/1.15 |
| 2013/0244632 A1 | 9/2013 | Spence et al. |
| 2013/0268676 A1 | 10/2013 | Martins et al. |
| 2013/0273964 A1* | 10/2013 | Patino ............... H04W 52/0277 455/574 |
| 2013/0325934 A1 | 12/2013 | Fausak et al. |
| 2013/0328997 A1 | 12/2013 | Desai |
| 2013/0336472 A1 | 12/2013 | Fahlgren et al. |
| 2013/0340094 A1* | 12/2013 | Majeti ............... H04L 51/02 726/28 |
| 2014/0013400 A1 | 1/2014 | Warshavsky et al. |
| 2014/0025503 A1 | 1/2014 | Meyer et al. |
| 2014/0058806 A1 | 2/2014 | Guenette et al. |
| 2014/0064467 A1* | 3/2014 | Lawson ............... H04M 15/51 379/114.03 |
| 2014/0072115 A1* | 3/2014 | Makagon ............ H04M 3/5175 379/265.09 |
| 2014/0073291 A1 | 3/2014 | Hildner et al. |
| 2014/0074618 A1* | 3/2014 | Agarwal ............ G06Q 30/0267 705/14.64 |
| 2014/0095627 A1* | 4/2014 | Romagnino ........ H04L 51/043 709/206 |
| 2014/0101058 A1 | 4/2014 | Castel et al. |
| 2014/0105372 A1 | 4/2014 | Nowack et al. |
| 2014/0106704 A1 | 4/2014 | Cooke et al. |
| 2014/0122600 A1 | 5/2014 | Kim et al. |
| 2014/0123187 A1* | 5/2014 | Reisman .......... H04N 21/43615 725/38 |
| 2014/0126715 A1 | 5/2014 | Lum et al. |
| 2014/0129363 A1 | 5/2014 | Lorah et al. |
| 2014/0129942 A1* | 5/2014 | Rathod ............ H04N 21/44226 715/720 |
| 2014/0153565 A1 | 6/2014 | Lawson et al. |
| 2014/0185490 A1 | 7/2014 | Holm et al. |
| 2014/0226522 A1* | 8/2014 | Anandappan ....... H04W 40/246 370/254 |
| 2014/0229868 A1* | 8/2014 | Samokar ............... G06F 3/0484 715/762 |
| 2014/0254600 A1 | 9/2014 | Shibata et al. |
| 2014/0258481 A1 | 9/2014 | Lundell |
| 2014/0269333 A1 | 9/2014 | Boerjesson |
| 2014/0274086 A1* | 9/2014 | Boerjesson ......... H04L 65/1104 455/450 |
| 2014/0282473 A1 | 9/2014 | Saraf et al. |
| 2014/0289391 A1 | 9/2014 | Balaji et al. |
| 2014/0304054 A1 | 10/2014 | Orun et al. |
| 2014/0304260 A1* | 10/2014 | Ulm ............... G06Q 10/107 715/733 |
| 2014/0317640 A1 | 10/2014 | Harm et al. |
| 2014/0355600 A1 | 12/2014 | Lawson et al. |
| 2014/0372508 A1 | 12/2014 | Fausak et al. |
| 2014/0372509 A1 | 12/2014 | Fausak et al. |
| 2014/0372510 A1 | 12/2014 | Fausak et al. |
| 2014/0373098 A1 | 12/2014 | Fausak et al. |
| 2014/0376543 A1* | 12/2014 | Malatack ........... H04L 65/1059 370/352 |
| 2014/0379670 A1 | 12/2014 | Kuhr |
| 2015/0004932 A1 | 1/2015 | Kim et al. |
| 2015/0004933 A1 | 1/2015 | Kim et al. |
| 2015/0023251 A1 | 1/2015 | Giakoumelis et al. |
| 2015/0026477 A1 | 1/2015 | Malatack et al. |
| 2015/0066865 A1 | 3/2015 | Yara et al. |
| 2015/0081918 A1 | 3/2015 | Nowack et al. |
| 2015/0082326 A1* | 3/2015 | Milliron ............ G06F 11/3089 719/318 |
| 2015/0082378 A1 | 3/2015 | Collison |
| 2015/0100634 A1 | 4/2015 | He et al. |
| 2015/0119050 A1 | 4/2015 | Liao et al. |
| 2015/0131444 A1* | 5/2015 | Malatack ............ H04L 51/066 370/235 |
| 2015/0181631 A1 | 6/2015 | Lee et al. |
| 2015/0236905 A1 | 8/2015 | Bellan et al. |
| 2015/0281294 A1 | 10/2015 | Nur et al. |
| 2015/0358416 A1* | 12/2015 | Gariepy ............ H04L 51/52 709/204 |
| 2015/0365480 A1 | 12/2015 | Soto et al. |
| 2015/0370788 A1 | 12/2015 | Bareket et al. |
| 2016/0011758 A1 | 1/2016 | Dornbush et al. |
| 2016/0028695 A1* | 1/2016 | Binder ............ G06F 21/80 726/12 |
| 2016/0036869 A1* | 2/2016 | Logan ............ H04L 51/046 379/265.09 |
| 2016/0056997 A1* | 2/2016 | Broadworth ............ H04M 3/56 370/221 |
| 2016/0077693 A1 | 3/2016 | Meyer et al. |
| 2016/0112475 A1 | 4/2016 | Lawson et al. |
| 2016/0112521 A1 | 4/2016 | Lawson et al. |
| 2016/0119291 A1 | 4/2016 | Zollinger et al. |
| 2016/0127254 A1 | 5/2016 | Kumar et al. |
| 2016/0135020 A1* | 5/2016 | Moshir ............ H04L 51/58 455/466 |
| 2016/0149956 A1 | 5/2016 | Birnbaum et al. |
| 2016/0162172 A1* | 6/2016 | Rathod ............ G06F 9/451 715/747 |
| 2016/0173583 A1* | 6/2016 | Rajan ............ H04L 67/10 709/223 |
| 2016/0191430 A1* | 6/2016 | Malatack ............ H04L 47/125 370/329 |
| 2016/0205519 A1 | 7/2016 | Patel et al. |
| 2016/0212093 A1* | 7/2016 | Meixler ............ H04L 51/066 |
| 2016/0226937 A1 | 8/2016 | Patel et al. |
| 2016/0226979 A1 | 8/2016 | Lancaster et al. |
| 2016/0234391 A1 | 8/2016 | Wolthuis et al. |
| 2016/0239770 A1 | 8/2016 | Batabyal et al. |
| 2017/0339283 A1 | 11/2017 | Chaudhary et al. |
| 2018/0352156 A1* | 12/2018 | Garrido ............ H04L 65/1083 |
| 2020/0127940 A1* | 4/2020 | Lopez Fernandez ... H04L 65/80 |
| 2022/0353219 A1* | 11/2022 | Malatack ............ H04L 47/125 |

(56) References Cited

U.S. PATENT DOCUMENTS

2023/0125285 A1* 4/2023 Elshafie ............... H04W 28/26
                                                    370/329

FOREIGN PATENT DOCUMENTS

| | | |
|---|---|---|
| EP | 1464418 A1 | 10/2004 |
| EP | 1522922 A2 | 4/2005 |
| EP | 1770586 A1 | 4/2007 |
| EP | 2053869 A1 | 4/2009 |
| ES | 2134107 A1 | 9/1999 |
| JP | H10294788 A | 11/1998 |
| JP | 2004166000 A | 6/2004 |
| JP | 2004220118 A | 8/2004 |
| JP | 2006319914 A | 11/2006 |
| WO | 9732448 A1 | 9/1997 |
| WO | 02087804 A1 | 11/2002 |
| WO | 2006037492 A1 | 4/2006 |
| WO | 2009018489 A2 | 2/2009 |
| WO | 2009124223 A1 | 10/2009 |
| WO | 2010037064 A1 | 4/2010 |
| WO | 2010040010 A1 | 4/2010 |
| WO | 2010101935 A1 | 9/2010 |
| WO | 2011091085 A1 | 7/2011 |

OTHER PUBLICATIONS

Barakovic S., et al., "Survey and Challenges of QoE Management Issues in Wireless Networks," Hindawi Publishing Corporation, 2012, pp. 1-29.

Berners-Lee T., et al., "RFC 3986: Uniform Resource Identifier (URI): Generic Syntax," The Internet Society, Jan. 2005, 43 Pages, [Retrieved on Apr. 2, 2015] Retrieved from URL: https://tools.ietf.org/html/rfc3986.

Black Box Corporation: "Ethernet to Token Ring Bridge," Oct. 1999, 2 Pages, Retrieved from URL: http://blackboxcanada.com/resource/files/productdetails/17044.pdf.

Complaint for Patent Infringement, *Telinit Technologies Limited liability company v. Twilio Incorporated*, Civil Action No. 2:12-cv-663, filed Oct. 12, 2012, 17 Pages.

Examiner Interview Summary for U.S. Appl. No. 14/489,371, mailed Dec. 3, 2015, 3 Pages.

Examiner Interview Summary for U.S. Appl. No. 14/489,371, mailed May 8, 2015, 3 Pages.

Final Office Action for U.S. Appl. No. 14/489,371, mailed Jul. 22, 2015, 10 Pages.

Gwava Incorporated: "Archive Microsoft Office 365 Email | Retain Unified Archiving," Montreal, Canada, Jun. 24, 2015, 4 Pages, Retrieved from URL: http://www.gwava.com/Retain/Retain_for_Office_365.php.

Kim H., at al., "In-Service Feedback QoE Framework," 2010 Third International Conference on Communication Theory, Reliability and Quality of Service, 2010, pp. 135-138.

Matos R., et al., "Quality of Experience-Based Routing in Multi-Service Wireless Mesh Networks," Realizing Advanced Video Optimized Wireless Networks, IEEE, 2012, pp. 7060-7065.

Mu M., et al., "Quality Evaluation in Peer-to-Peer IPTV Services," Data Traffic and Monitoring Analysis, LNCS 7754, 2013, pp. 302-319, 18 pgs.

Non-Final Office Action for U.S. Appl. No. 14/489,371, mailed Nov. 3, 2014, 10 Pages.

Non-Final Office Action for U.S. Appl. No. 15/059,753, mailed Jan. 4, 2018, 24 Pages.

Notice of Allowance for U.S. Appl. No. 15/059,753, mailed May 10, 2018, 8 Pages.

Notice of Allowance for U.S. Appl. No. 15/059,753, mailed Jun. 15, 2018, 2 Pages.

Notice of Allowance for U.S. Appl. No. 15/059,753, mailed May 31, 2018, 5 Pages.

Notice of Allowance for U.S. Appl. No. 17/867,566, mailed Oct. 17, 2023, 2 Pages.

Notice of Allowance for U.S. Appl. No. 14/489,371, mailed Dec. 8, 2015, 13 Pages.

Realwire: "Aepona's API Monetization Platform Wins Best of 4G Awards for Mobile Cloud Enabler," 4G World 2012 Conference Expo, Oct. 30, 2012, 4 Pages, [Accessed on Nov. 5, 2015] Retrieved from URL: https://www.realwire.com/releases/Aeponas-API-Monetization.

Response to Final Office Action mailed Nov. 20, 2015 for U.S. Appl. No. 14/489,371, filed Sep. 17, 2014, 11 Pages.

Response to Non-Final Office Action mailed Apr. 30, 2015 for U.S. Appl. No. 14/489,371, filed Sep. 17, 2014, 10 Pages.

Response to Non-Final Office Action mailed Apr. 4, 2018 for U.S. Appl. No. 15/059,753, filed Mar. 3, 2016, 7 Pages.

Subramanya S R., et al., "Digital Signatures," IEEE Potentials, Mar./Apr. 2006, pp. 5-8.

Tran H.A., et al., "User to User Adaptive Routing Based on QoE," ICNS: The Seventh International Conference on Networking and Services, 2011, pp. 170-177.

Twilio: "Twilio Cloud Communications—APIs for Voice, VoIP, and Text Messaging," 8 Pages, [Retrieved on Jun. 24, 2015] Retrieved from URL: http://www.twilio.com/docs/api/rest/call-feedback.

\* cited by examiner

SYSTEM AND METHOD FOR ENABLING DYNAMIC MULTI-MODAL COMMUNICATION

CROSS-REFERENCE TO RELATED APPLICATIONS

This application is a continuation application of U.S. patent application Ser. No. 17/867,566, filed Jul. 18, 2022, which is a continuation of U.S. patent application Ser. No. 16/054,879, filed Aug. 3, 2018, now U.S. Pat. No. 11,394,673, which is a continuation application of U.S. application Ser. No. 15/059,753, filed Mar. 3, 2016, now U.S. Pat. No. 10,069,773, which is a continuation application of U.S. application Ser. No. 14/489,371, filed Sep. 17, 2014, now U.S. Pat. No. 9,325,624, which claims the benefit of U.S. Provisional Application No. 61/902,985, filed on Nov. 12, 2013, each of which is incorporated herein by reference.

TECHNICAL FIELD

This invention relates generally to the telecommunication field, and more specifically to a new and useful system and method for enabling dynamic multi-modal communication in the telecommunication field.

BACKGROUND

Mobile internet has brought about a wide variety of modes of communication. Mobile phone devices are capable of telephony communication such as SMS, MMS, and PSTN voice calls, as well as IP based communication such as client application messaging and VoIP. Despite the numerous modes of communication, communication applications are limited to the initial mode of established communication. Additionally, those wishing to communicate with a larger number of devices encounter feasibility issues because of the complications of dealing with such a diverse set of devices and communication options. Thus, there is a need in the telecommunication field to create a new and useful system and method for enabling dynamic multi-modal communication. This invention provides such a new and useful system and method.

DESCRIPTION OF THE PREFERRED EMBODIMENTS

The following description of preferred embodiments of the invention is not intended to limit the invention to these preferred embodiments, but rather to enable any person skilled in the art to make and use this invention.

1. System for Enabling Dynamic Multi-Modal Communication

Figure 1:
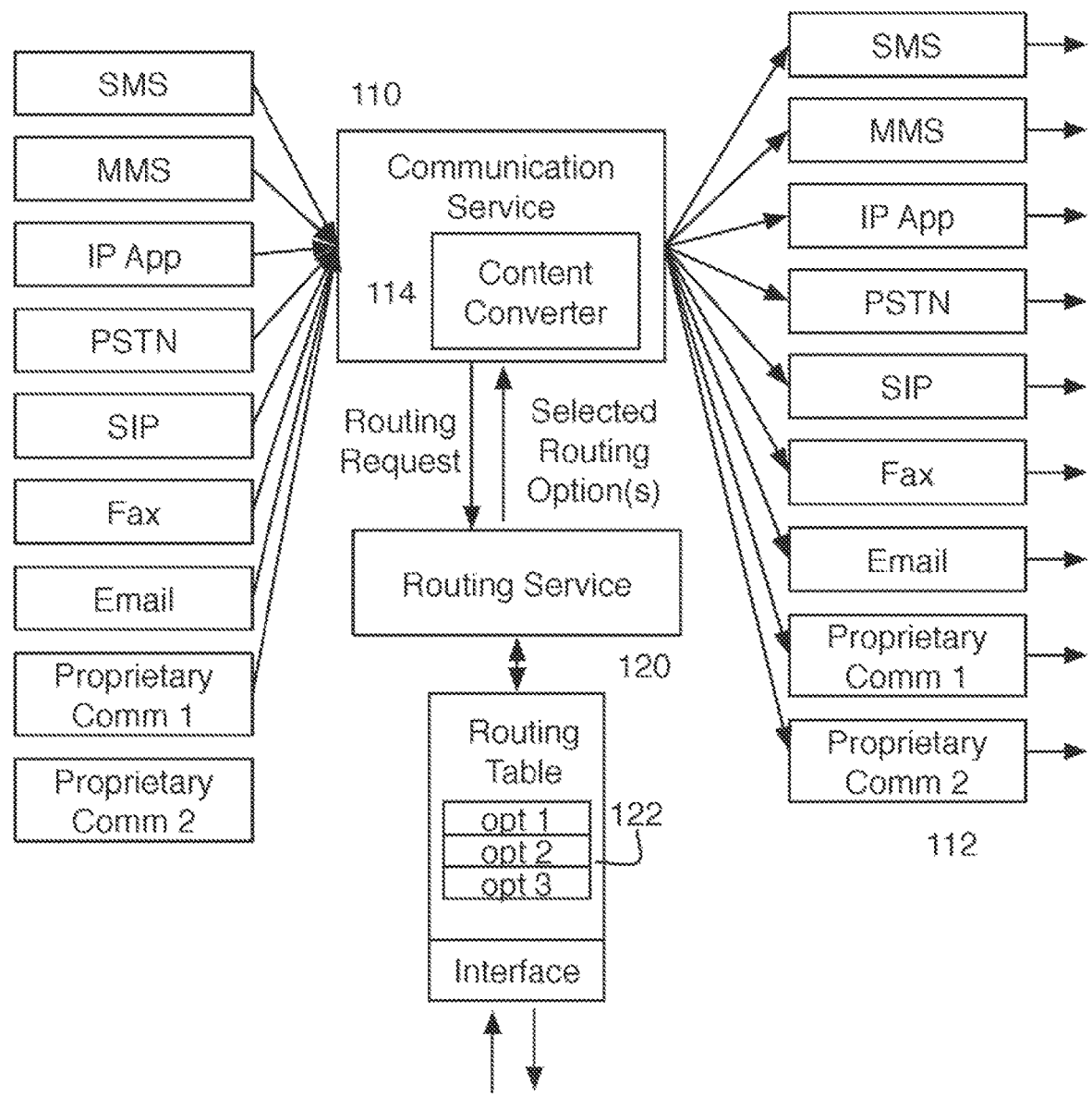
FIG. 1 is schematic representation of a system of a first preferred embodiment.

As shown in FIG. 1, a system for enabling multi-modal communication of a preferred embodiment can include a communication system no with a plurality of routing options 112 a content conversion engine 114 and a routing system 120 that includes a plurality of routing option profiles 122. The system functions to enable transparent multi-modal communication through a communication platform. The multi-modal communication is preferably transparent to users of the system in that an entity requesting communication expresses communication intent, and the system appropriately establishes the communication with one or more desired entities using a suitable transport protocol. Additionally, the system can manage full-duplex multi-modal communication—message and communication session responses can be similarly transparently managed by the system.

Figure 2:
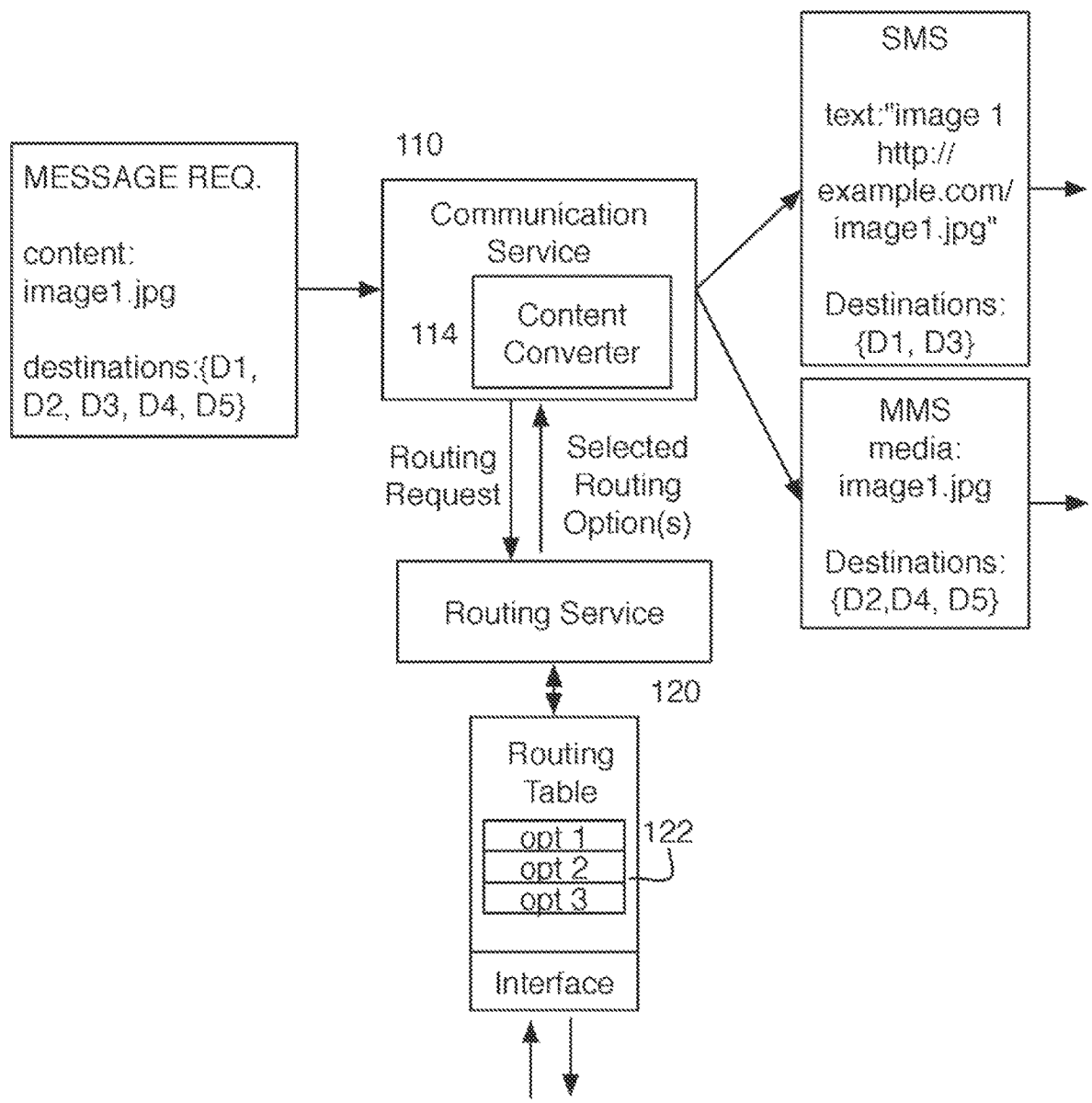
FIG. 2 is schematic representation of a system of a first preferred embodiment applied to a communication campaign.
Figure 3:
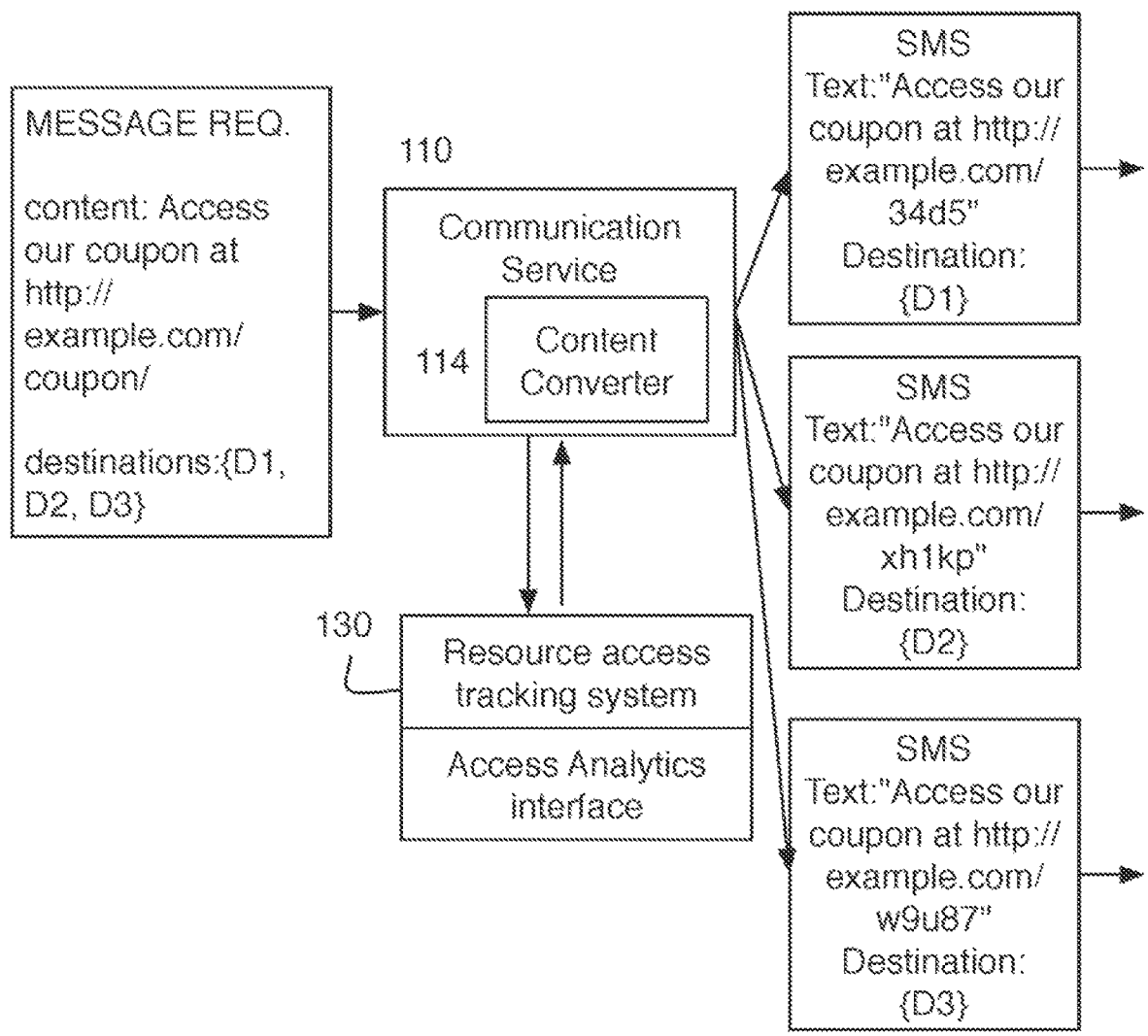
FIGS. 3-4 are schematic representations of variations of the system including a resource access tracking system.
Figure 4:
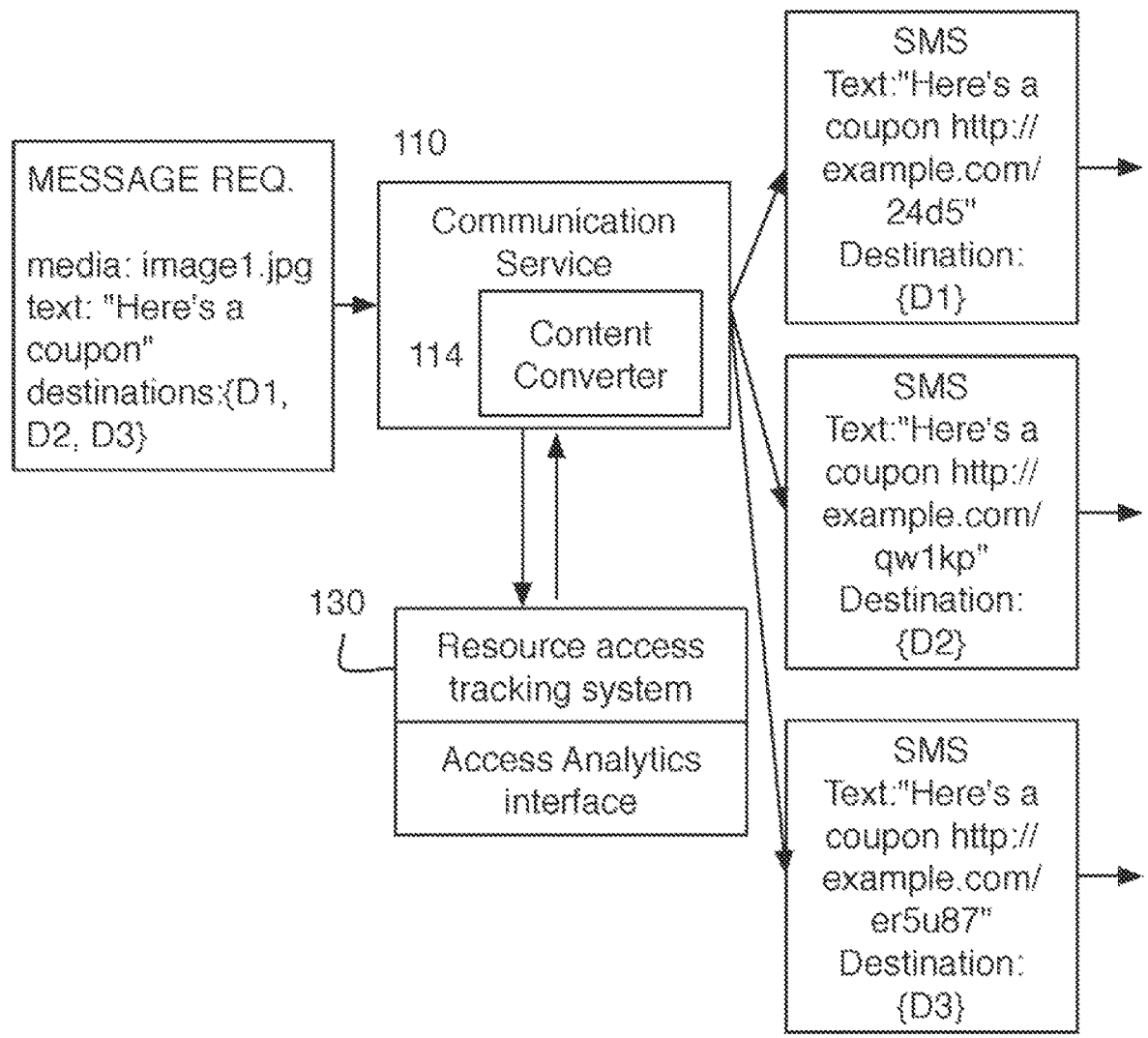
Figure 5:
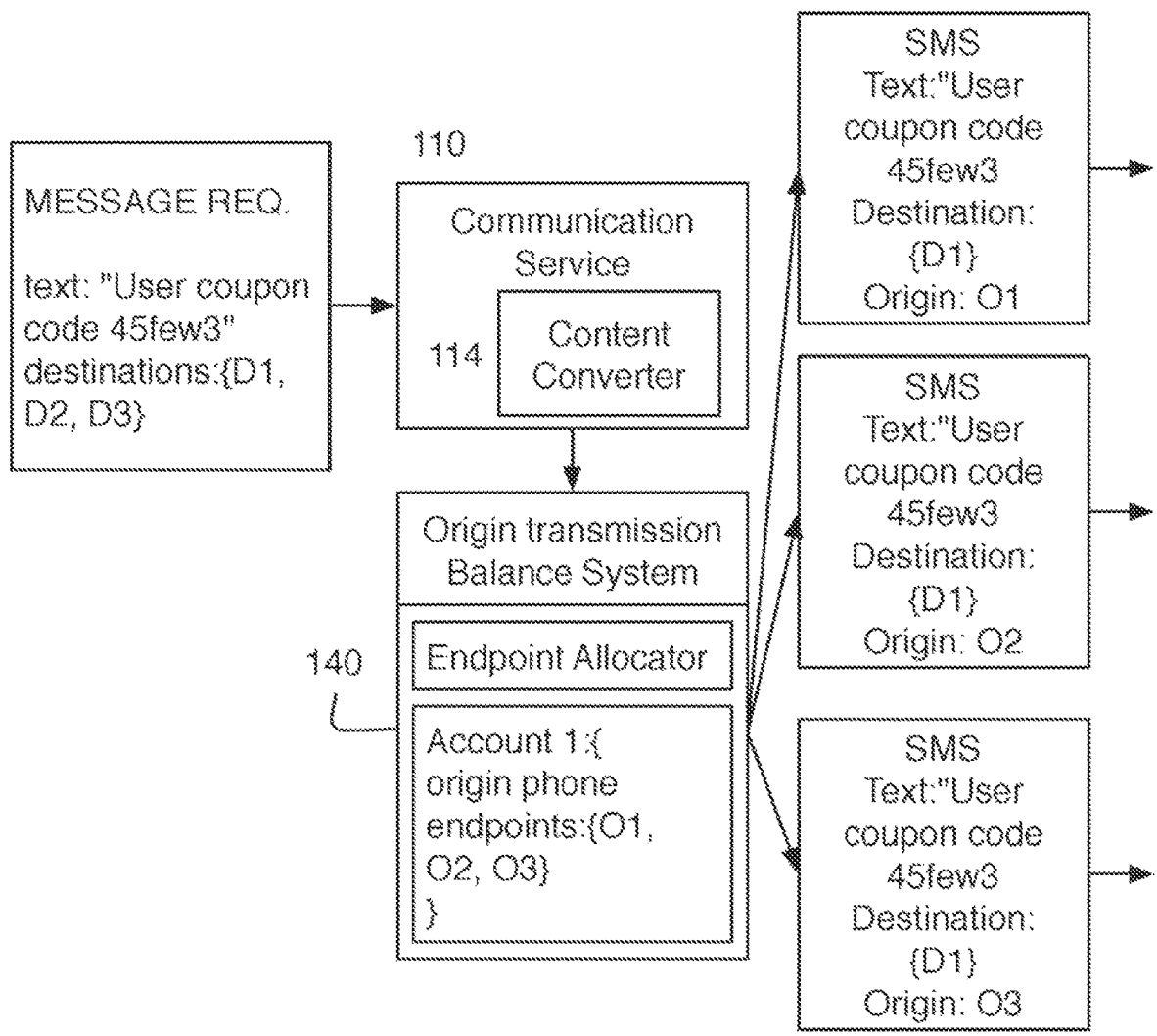
FIG. 5 is a schematic representation of a variation of the system including an origin transmission balance system.

Additionally, the system can be applied to facilitate communication campaigns wherein the system is used for transforming a communication request specifying multiple destinations into multiple customized communications for a set of destinations as shown in FIG. 2. The system may additionally include a resource access tracking system 130 and/or an origin transmission balance system 140 as shown in FIGS. 3-5. When the system is applied to communication campaigns, the system functions to simplify the process of sending a communication or a set of communications to a set of different target entities. Several complicating aspects of communicating with multiple destinations are simplified so that an end user (e.g., an application or a developer account) can simply express communication intent. The communication intent can include message contents and a set of destinations. The communication intent is processed such that each destination is transmitted in an appropriate manner. Aspects that may complicate a campaign can include selecting an appropriate communication mode (e.g., SMS, MMS, IP messaging, voice, etc.), balancing transmissions across origin endpoints, geographical/regional customization, time window restrictions for when the communication is relevant (i.e., TTL limits of a communication), tracking receipt or interaction with a communication, and/or other aspects. The system may be applied to address these problems.

The system is preferably integrated with a multitenant communication platform that provides communication services to developer applications and services. The system is preferably implemented in combination with a telephony platform such as the one described in patent application Ser. No. 12/417,630 filed 2 Apr. 2009, entitled "System and Method for Processing Telephony Sessions", which is hereby incorporated in its entirety by this reference. The telephony platform is preferably a multitenant telephony platform that allows multiple accounts to configure telephony applications for use on the platform. The telephony platform can be designed for one or more mediums of communication. The telephony platform can additionally be a cloud hosted platform as a service system or an on-premise solution. The telephony platform can be a server, a server cluster, a collection of components on a distributed computing system, or any suitable network accessible computing infrastructure. The system may alternatively be used in combination with a text or multi-media based messaging system, a video or voice chat system, a screen-sharing system, and/or any suitable communication platform.

The communication system no of a preferred embodiment functions to receive communication requests and establish communications as regulated by input of the routing system 120 and the communication cost service 130. The communication service 110 can comprise of one or more services that establish communication through various channels and over varying protocols of the plurality of routing options 112.

The communication system no preferably includes a communication request input to receive communication requests. A communication request preferably specifies at least one communication destination. The communication destination can be a communication endpoint such as a telephony number, a short code phone number, a SIP address, a communication account identifier, and/or any suitable communication endpoint. The communication destination may alternatively be a higher-level destination entity identifier, wherein a single communication entity identifier can be associated with multiple communication endpoints. For example, a user ID may be associated with a telephone communication endpoint and an IP communication application endpoint. The communication request may include a set of communication destinations.

In one variation, the communication request additionally will include an origin identifier or origin identifiers. In a first variation, the origin identifier will be the communication endpoint that will be connected or that will be indicated as the sender. The origin endpoint can be some variety of communication endpoints as described above. An origin identifier is preferably managed by the telephony platform, which includes terminating communication to that communication endpoint and preferably making outgoing communications from that communication endpoint. An account or any suitable platform entity scope can have an allocated origin identifier. Herein accounts are described as the preferred assignee of an allocated communication endpoint that can be used as an origin endpoint, but communication endpoints can be allocated to any suitable entity. In one variation, each account will have at least one communication endpoint to make or receive communications. In another variation, an account may use a pool of shared communication endpoints shared between multiple accounts. In some cases, proxy communication endpoints can be established if the endpoints of the legs of the communication do not use compatible forms of endpoints. The communication endpoint of the origin can be the same type or a different type of communication endpoint as the communication destination. The origin identifier can be explicitly included in the communication request or the origin identifier can be associated with an account associated with the communication request.

When multiple communication destinations are specified, the set of origin identifiers are preferably used to balance transmission of the set of communications. For example, when sending SMS messages or MMS messages carriers will throttle or prevent sending a certain number of messages in a given period and also the rate at which those messages are sent. The system can schedule and distribute message transmission across the origin identifiers. In another variation, the origin identifiers are not expressed in which case the origin for a communication may be set to a default origin identifier. Alternatively, the full set of origin identifiers for an account may be used. In yet another variation, a transmission time window may be specified which could signal a time-to-live constraint. Transmission is preferably balanced across the origin identifiers with scheduling to satisfy the time window constraint. Additionally, origin identifiers may be dynamically allocated to an account to satisfy transmitting the set of communications in the time window.

A communication medium may be implicit for the communication system such as in the situation where only one medium is available, but the communication medium may alternatively be specified in the request. The medium can specify a general form of the communication, such as voice, video, text, synchronous, and/or asynchronous. The medium can alternatively specify particular protocols of communication such as SMS, MMS, PSTN, SIP, and the like. In appropriate communication requests, frequently asynchronous communication requests, the content of the communication maybe included in the request. For example, the text for an SMS message is preferably included in the communication request. In other variations, the communication request is for establishing a synchronous communication session between the source and the destination such as in a voice or video call where communication can occur between at least two communication endpoints in real-time. Additionally a request can include an urgency property, which determines communication guarantees and TTL (Time to live) procedures of an established communication.

The communication request is preferably received using an application programming interface (API). More preferably the communication request is received through a representational state transfer (REST) API, Restful (i.e., having characteristics of a REST API) can include the characteristics of having a uniform interface separating client and servers, the client-server communication is stateless where all information to process a client request is transferred in the request; cacheable requests if specified, interoperability with a layered service infrastructure, and/or a uniform interface between clients and servers. The API can be exposed externally such that requests directly originate from outside entities. The API can alternatively be an internal API used during operation of the telephony platform.

Alternatively, the communication request input may be an application processing system, wherein an instruction in a script or application code triggers an event for acting on communication event. In another variation, the communication request input can be an eventing system controlled through a user interface. For example, an account may set up various text/media messaging campaigns through an administrator control panel.

The communication request can alternatively be received from an incoming communication through a supported communication transport protocol. Preferably the communication platform acts as a proxy or register for a number of endpoints, such that communications initiated outside the communication platform and directed at endpoints registered by the platform are routed to the communication platform for handling. The communication platform can include mappings of endpoints to applications, other destination endpoints, or use any suitable logic to determine a content and destination of a communication. Processing of incoming communications can be used to enable two-way transformation of communications between at least two endpoints.

The plurality of routing options 112 of a preferred embodiment functions to service communications from the system to at least one destination endpoint. The plurality or routing options 112 preferably includes a set of different communication services that target different transport protocols. For example, the plurality of routing options 112 can include an SMS service, MMS service, a push notification service, an IP messaging service, proprietary third party messaging service, PSTN service, SIP voice service, video communication service, screensharing service, fax service, email service, and/or any suitable communication service. Each of the communication services can include dedicated communication service instances for different routing options (e.g., different carriers, regions, and the like). Alternatively, a communication service can use multiple different routing options when communicating. The routing options can be used in transmitting messages, receiving messages, managing synchronous communication sessions, or performing any suitable operation of a given transport protocol. Depending on the message medium and possibly the origin and destination endpoints, the routing options may be different channel protocols directed at different service provider destinations. For an SMS message, the routing options may be SMPP connections to various service provider destinations. The routing options of an MMS message can be SMTP connections to various service provider destinations (for MM4) or alternatively they can be various service resources accessed over HTTP/SOAP (for MM7). A voice call can have routing options including PSTN channels of different carriers, SIP, and other protocols. The routing options preferably include various commercial relationships between the service provider and the communication platform. The routing options can additionally span multiple mediums/transport protocols. For example, a message router may be configured to selectively transmit a message using a routing option selected from SMS routing options, proprietary push notification routing options (e.g., Apple or Google push notifications) and application messaging routing options (e.g., message sent to a Whatsapp user).

The content conversion engine 114 of a preferred embodiment functions to transform content. In one variation, the content conversion engine 114 transforms content from a first form suitable for a first protocol to a second form suitable for a second form. In another variation, the content conversion engine 114 transforms content to otherwise satisfy the constraints associated with communication intent. For example, the content conversion engine 114 can convert resource links into trackable resource links in coordination with the resource tracking system 130. The content conversion engine can include various media processing services, routines, and modules. The content conversion engine 114 can be a standalone service of a platform or alternatively integrated within a variety of other components such as the various routing option services 112. The content conversion engine 114 can include various media processing components such as a media transcoding engine, text-to-speech (TTS) service, speech recognition engine, and other suitable media processing services. The content conversion engine 114 can additionally include content formatting services that ensure content is suitable for communication over a selected routing option. Different routing options can have different rules such as character limits, media size limits, metadata information, security tokens, and other suitable communication properties. The formatting services can translate content to a format suitable for a message. For example, text content may require being split in to multiple messages for delivery over SMS. The content conversion engine 114 can transform content media prior to delivery to a destination. For asynchronous messages, the media is transformed and then transmitted. In synchronous communication, the content conversion engine 114 could stream the converted media content such as down sampling an inbound audio stream and routing to an endpoint with a communication channel with lower bandwidth. In another variation, the content conversion engine may convert asynchronous communication to generated media played during a synchronous communication session. For example, a first user may carry on a text message based chat with a person listening to a phone call, where the text messages of the first user are converted using a text to speech service and responses of a user are presented as audio media messages or transcribed responses. Such transformations can be performed to fulfill different constraints expressed in the communication intent parameters. In one variation, an asynchronous message such as a text, picture, or video message may be converted to a message delivered over a voice or live video chat session as a way of verifying receipt of the message. For example, a text message can be converted to speech audio played during the call. Since the system may not be able to verify you saw a text message, reading the text message may ensure the message was delivered and possibly heard by the user. Additionally, the system can expose the extent of message delivery during the synchronous delivery of the communication. For example, if a user hangs up half way through the audio, the message is 50% received by the user.

The routing system 120 functions to generate at least one possible routing option for the outbound routing of the communication service no. The routing system 120 receives routing requests from the communication system 110. The routing system 120 is configured to process the request and use properties of the request to generate at least one selected/recommended routing option. More preferably the routing system generates a set of at least two routing options and returns the list to the communication system 110. The set or list of routing options can be prioritized or include parameters that can be used to select a desired routing option. The routing system 120 preferably includes a routing table. The routing table includes a list of available routing option profiles 122. In one variation, a routing option profile in the routing table preferably includes an assigned priority and a weight. The priority and weight may be assigned for different communication parameters. For example, the prefix of a destination phone number is preferably associated with various routing options each having a priority and weight. The routing table can include additionally or alternative parameters associated with the different routing options such as quality score, regional associations (e.g., related country codes or area codes or geographic proximity), quota prioritizations, internal cost (e.g., cost to the platform), effective internal cost (e.g., cost to transmit requested content considering transforming the content into multiple messages), and/or any suitable parameter used in selecting a routing option. The quota prioritization parameter can be used to prioritize a routing option in response to a contractual obligation. Some routing options can be maintained through contractual obligations of meeting a quota of communications (e.g., number of calls, number of messages, rate of communication). This quota prioritization parameter can be dynamically updated or fixed based on the communication restriction. The quota prioritization can be used to positively count towards the selection of that routing option (e.g., if a system wants to meet a certain quota of messages) or alternatively negative impact selection (e.g., if a system wants to avoid going over a limit). The relative properties for the associated routing options are used to generate a route priority list. The routing priority list is a customized list of routing options prioritized for a particular communication request. Multiple routing options are prioritized in order of preference. The listed routing options may not have indicated preference and be a sub-set of the full set of routing options.

The routing option profiles 122 functions to characterize different channels of communication available to the communication platform. As mentioned above, a routing option can exist for large variety of transport protocols such as the communication protocols for SMS messaging, MMS messaging, push notifications, an IP messaging, proprietary third party messaging, PSTN voice, SIP voice, video communication service, screensharing, faxing, email, and/or any suitable communication protocol. The routing options can include parameters that can be used in selecting a routing option based on content type and/or urgency properties. When translating between different modes of communication, the different transport protocols can have different prioritization. For example, media messaging is preferably sent through a routing option with similar media support. The routing system 120 may additionally include a routing table interface such that an administrator or client device may update the parameters used to determine the communication routing. Routing options can preferably be added, removed, or updated. In one exemplary use case, an administrator may need to update the routing options based on contract changes with various carriers. In another exemplary use case, communication performance may unexpectedly drop for a carrier. An administrator could easily edit the routing table such that communications avoid that carrier until the issue is resolved. In yet another use case, communication quality of a used routing option is measured and used to update a quality parameter of a routing option. In another variation, the routing table interface is an application programming interface (API) such that parameters of the routing table maybe automatically updated.

The resource access tracking system 130 functions to facilitate running communication campaigns that depend on resource links. The resource access tracking system functions to automatically create trackable communication campaigns. The resource access tracking system 130 is preferably invoked when media, applications, and/or website access should be tracked. The resource access tracking system preferably creates unique tracking resource links for a given communication and resource in that communication. The resources access tracking system 130 is preferably used to simplify generation of a messaging campaign. In one use case, an account holder will want to transmit a message with a promotional URI in the message body to a set of different endpoints. The content conversion engine 114 preferably detects the URI and cooperates with the resource access tracking system 130 to generate a unique URI for each message transmitted in the campaign as shown in FIG. 3. When a user accesses the link, the tracking link will detect the access, optionally collect information about the accessing device, and then redirect to the originally intended resource. The resource access tracking system 130 preferably creates some interface through which access information is exposed. In one variation, a campaign control panel can present various statistics about the access rates, which endpoints actually accessed the resource, device information about those that accessed, and other suitable information. In one variation, a URI is converted to a trackable URI as shown in FIG. 4. In another variation, a media resource is converted to a hosted media resource accessible at or through a trackable URI. In another variation, an application referenced through an application URI protocol is changed for a web-based trackable URI that redirects to the application URI.

The resource access tracking system 130 may additionally be used to set dynamic message tailoring through various data driven communication optimization. In one variation, communication intent may include a set of optional content. The resource access tracking system 130 may facilitate evaluating access of different message options and then automatically selecting more successful message options. For example, A/B testing within a set of options may allow later transmissions in the campaign to use message options vetted through A/B evaluation.

The origin transmission balance system 140 functions to coordinate distributing communications across multiple origin identifiers. As mentioned above some forms of communication have communication rate and cap limits. For example, long codes and short codes both have limits on total number of messages per day and the inter-message transmission rate. Violating such limits may result in communication failure for that or subsequent communications. The origin transmission balance system can preferably automatically plan and schedule when and from what endpoints communications will be sent as shown in FIG. 5. The origin transmission balance system 140 can additionally include heuristics that account for regional proximity between origin identifiers and destination identifiers. For example, local origin identifiers may be preferred over out of area phone numbers or phone numbers with different country codes. The origin transmission balance system 140 may additionally facilitate allocating communication endpoints to better fulfill a communication request.

2. Method for Enabling Dynamic Multi-Modal Communication

Figure 6:
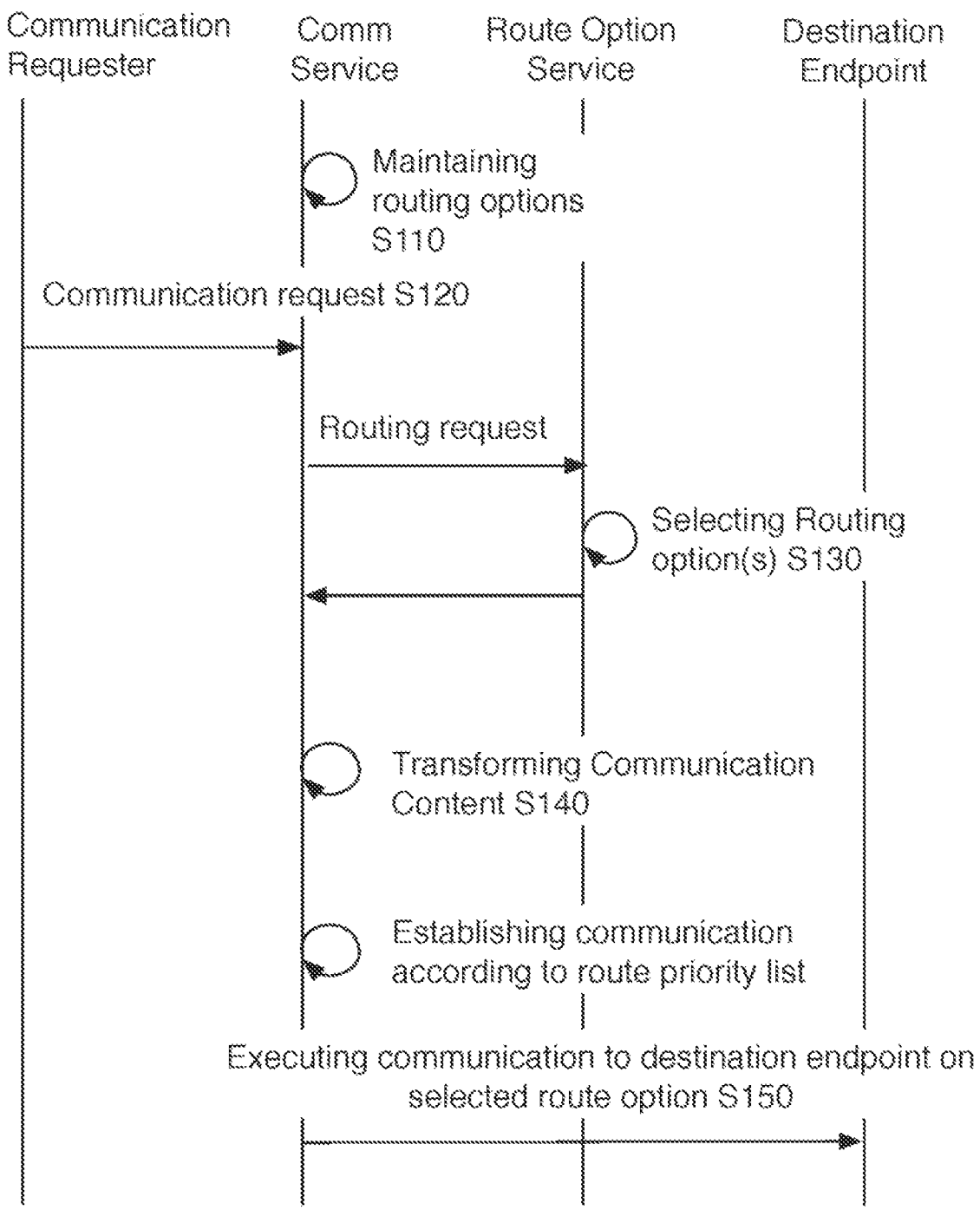
FIG. 6 is a communication flow diagram of a method sending an asynchronous message.
Figure 7:
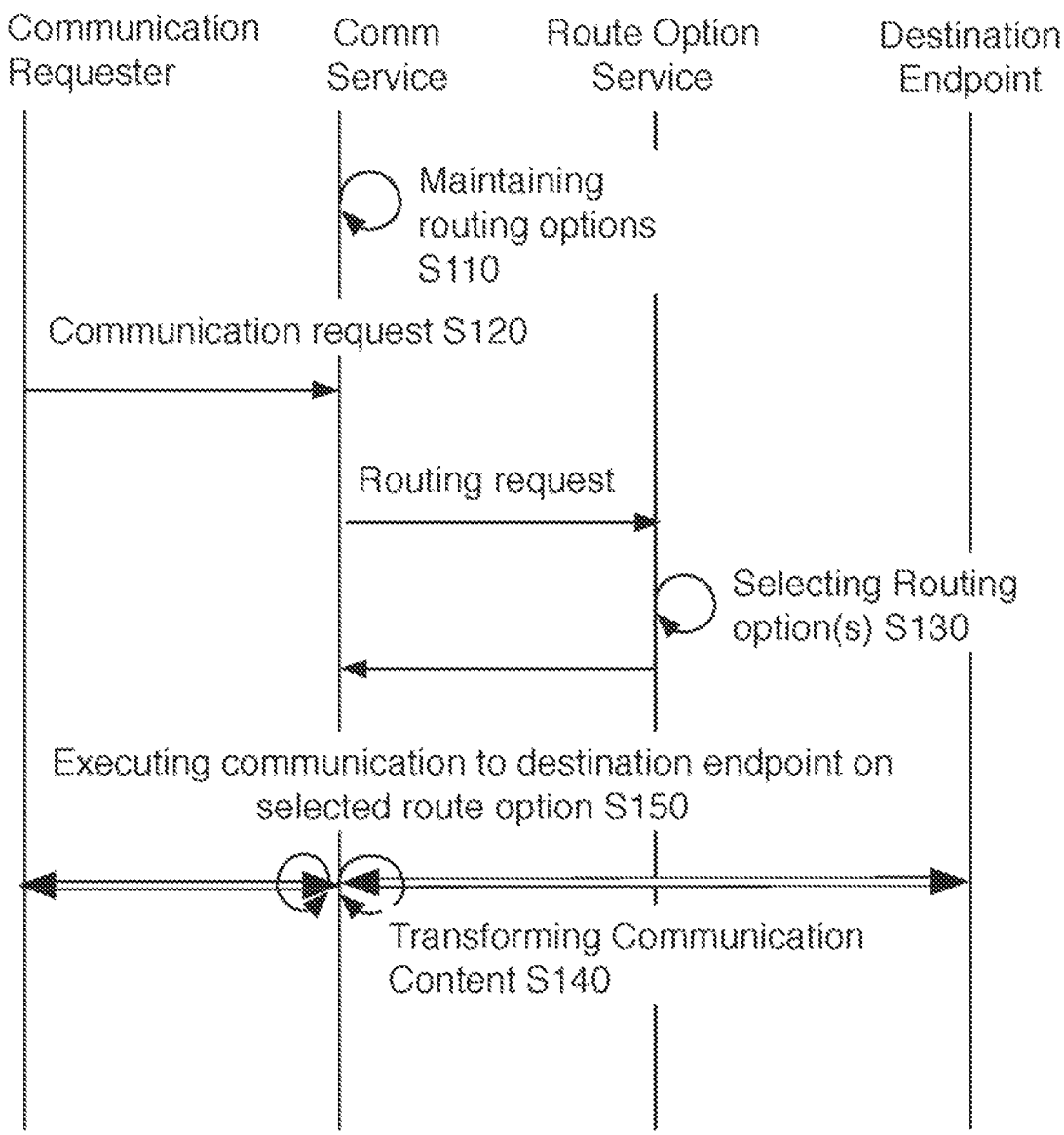
FIG. 7 is a communication flow diagram of a method establishing a synchronous communication session.

As shown in FIGS. 6 and 7, a method for enabling dynamic multi-modal communication of a preferred embodiment can include maintaining routing options of at least two transport protocols S110, receiving a communication request S120, selecting routing option S130, transforming content of communication request to compatible form of the selected routing option S140, and transmitting transformed content to a destination endpoint on the selected routing option S150. The method functions to normalize communication to be automatically communicated according to communication intent. The method functions to simplify send of a message by abstracting the complexity of sending a message in a fractured and complex communication environment.

The method can be used in transmitting an outbound communication, but, in one variation, may be implemented in two communication conversations/sessions so that responses to communications are similarly transformed to an appropriate transport protocol. The method is preferably used to unify communication across a plurality of communication protocols. Some exemplary communication transport protocols can include SMS, MMS, Fax, email, IP messaging, push notifications, PSTN voice, SIP voice, SIP video, IP based synchronous communication, and/or any suitable form of communication. As shown in FIG. 6, the method can be applied to asynchronous communication, but the method can additionally or alternatively be applied to asynchronous communication as shown in FIG. 7 or a hybrid of synchronous and asynchronous transport protocols. In addition to unifying modes of communication, the method can unify different destination endpoints of a user.

In one implementation, the method is used by developers, applications, and services to express communication intentions, such as intended content of a message, intended mode of a communication session, communication constraints such as timing, budget, and other suitable intent parameters. For example, an application can specify an image and text that should be delivered to an endpoint. The method operates to deliver the content of the intended media, possibly transforming the final delivered format to conform to an appropriate mode of communication with the destination.

Figure 8:
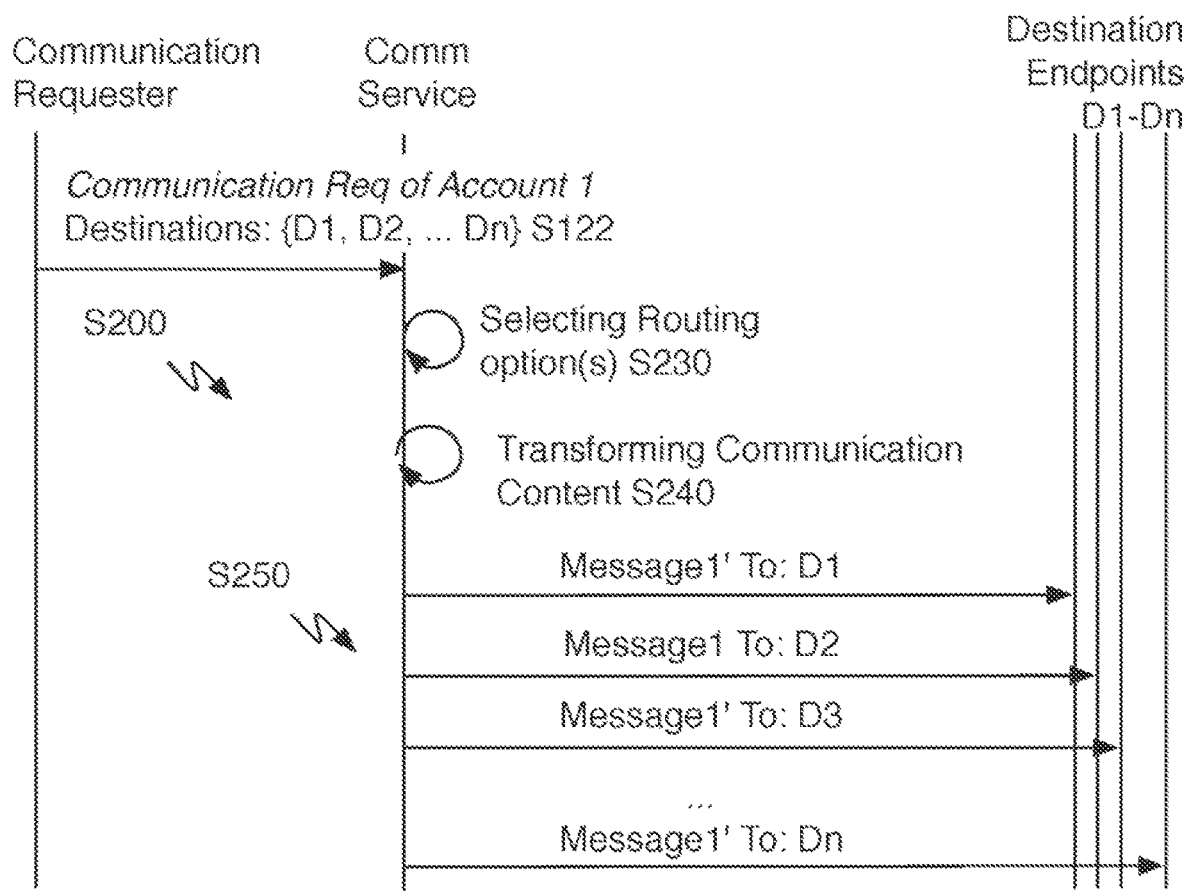
FIG. 8 is a communication flow diagram of a variation of applying the method iteratively to a set of destination entities.

While the method can be applied to the delivery of a single communication to a single destination entity, the method is more preferably applied to executing outbound communication campaigns wherein an account, application, or service expresses intent to deliver one or more communications to a set of destination endpoints. In this preferred embodiment, as shown in FIG. 8, the method more preferably includes applying the method iteratively to a set of destination entities indicated in the original request, which would include receiving a messaging request that includes communication intent parameters and a set of communication destinations S122 and dynamically transforming message transmissions to the communication destinations according to individual communication destinations S200, wherein block S200 includes for each communication destination in the set of destinations: selecting a communication mode according to the communication intent parameters S230, transforming content of communication request S240, and transmitting transformed content to a destination endpoint in the selected communication mode S250. The method functions to handle expressing communication intent for a plurality of destinations, and then having a communication system automatically execute those communications. The method can handle differing device capabilities and/or preferences, various communication message formats. Numerous entities use mass-recipient messaging campaigns, sending SMS or MMS messages with links, promotional offers, or media.

Figure 9:
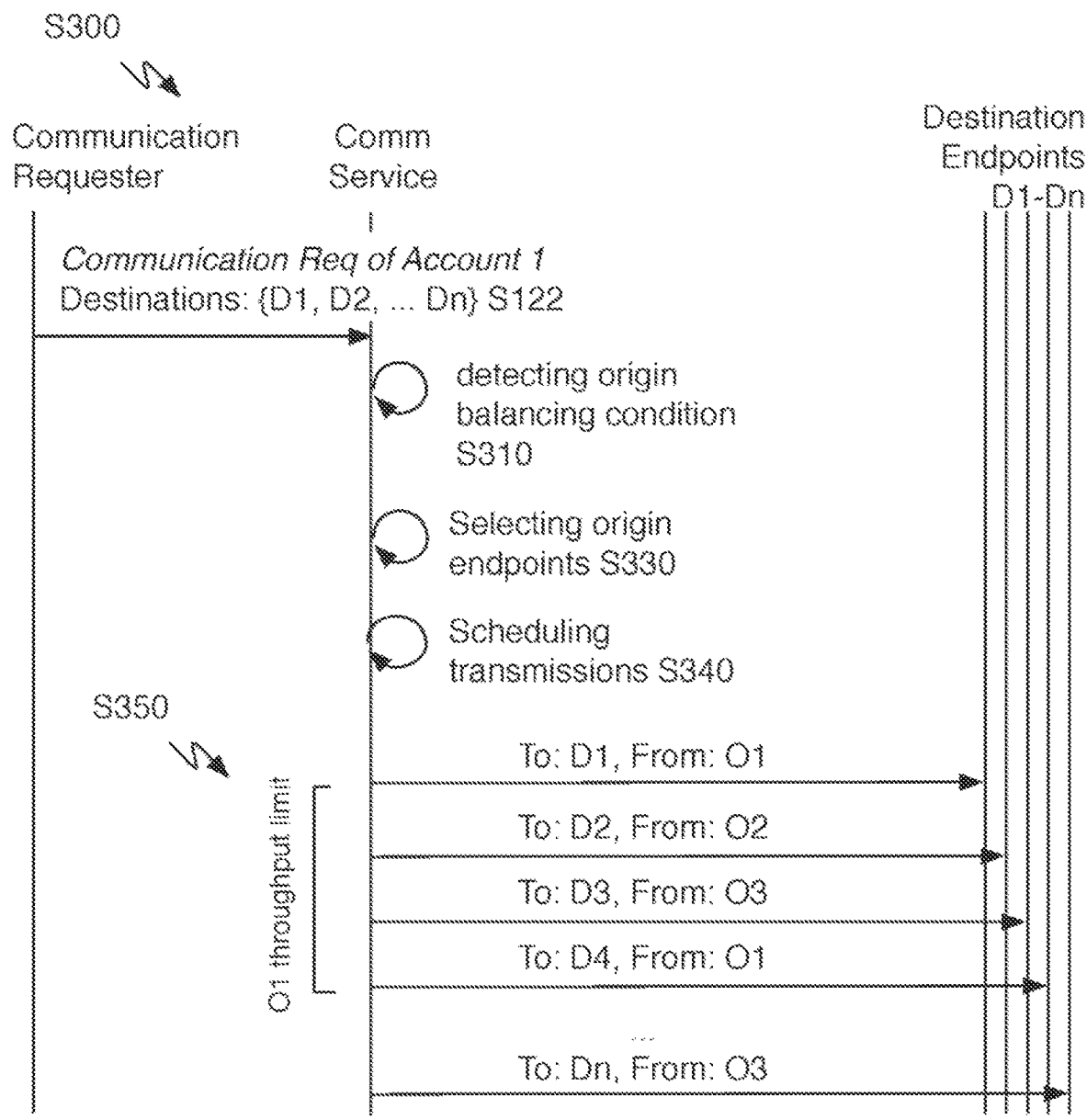
FIG. 9 is a communication flow diagram of a variation of balancing transmissions across a set of origin identifiers.

In some cases, such campaigns may have various constraints. A communication request can specify a time-to-live constrain, which can act to define a set time window in which the message is relevant. The method can manage transmission of the plurality of messages such as to satisfy the TTL requirement or fulfill the TTL requirement in an appropriate manner (reporting which numbers were not contacted due to a TTL failure). As described more below, the time constraint may additionally be used to impact the selection and/or allocation of originating phone numbers as shown in FIG. 9. Additionally, phone number management may be performed independent of communication content augmentation, but may additionally be performed with communication modality and content transformation. In one example, the phone number management is applied to communications that are delivered with unaltered content and are fixed to an SMS communication mode. In another example, the phone number management is applied to communications that may be selectively sent over different routing options and may or may not receive content transformation.

Figure 11:
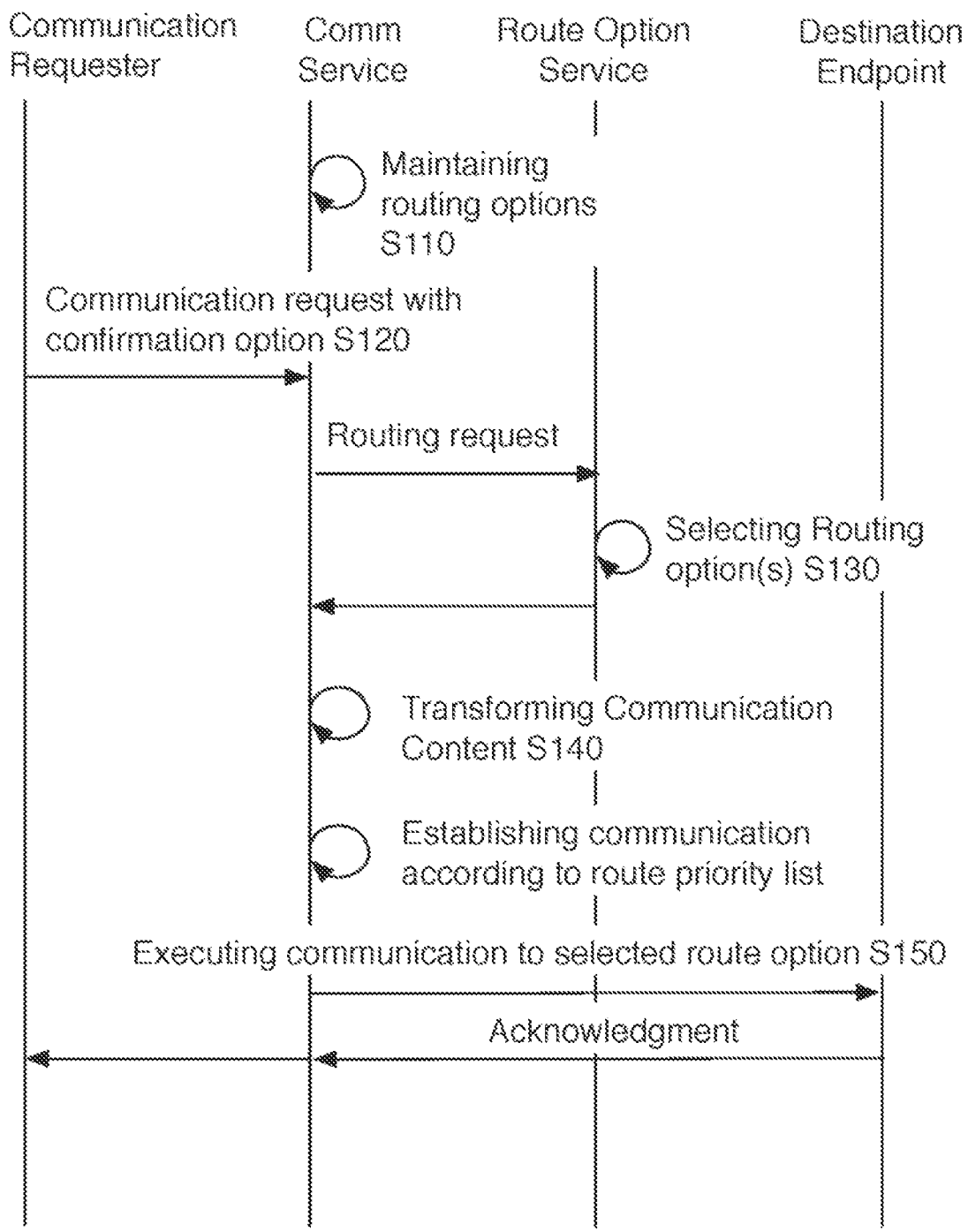
FIG. 11 is a communication flow diagram of a method for responding to responses from a destination.
Figure 12:
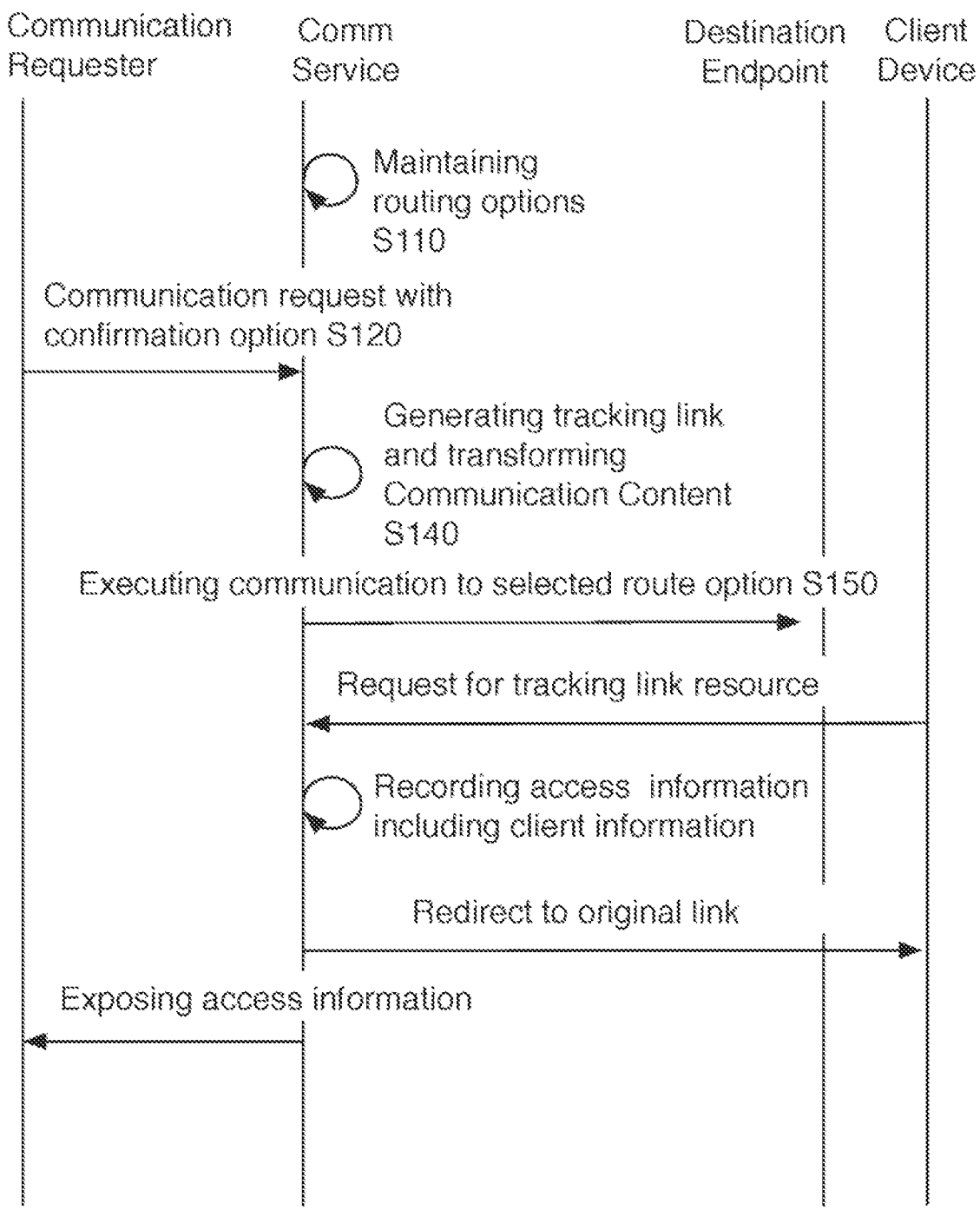
FIG. 12 is a communication flow diagram of a method for capturing communication interactions through trackable links.

In another variation, a communication request can specify a confirmation constraint where the sender wants feedback on delivery. As described below, this maybe implemented through use of a tracking link transformation process which can be used to transform telephony messages to individually trackable communications based on interactions with media, application, or website links as shown in FIGS. 11 and 12. The trackable link variation functions to enable simple communication intent to provide full cycle tracking of interaction with a communication for a set of different destinations. An account operator is alleviated of creating specialized links, tracking those links, and determining how those results are impacted by the communication. The trackable interactions may further be used in messaging campaigns to create content optimization through A/B testing and other data driven analysis and customization of a message. The tracking link transformation process may be used independently or in combination with other method variations such as the phone number management variation.

Block S110, which includes maintaining routing options of at least two transport protocols, functions to manage at least two different modes of communication. The modes of communication are preferably divided into multiple routing options. The routing options can include different transport protocols, but can additionally include different carriers, suppliers of a communication channel, regional routing options of a transport protocol, or any suitable route variation. Information relating to the routing options can be stored in a table or database of routing option profiles. The routing option profiles can be used in selecting preferred, optimal, or otherwise capable routing options when communicating. The routing options can additionally include different originating identifiers. The originating identifiers are different types of phone numbers (e.g., short codes, long codes, toll-free numbers, etc.). The originating identifiers can additionally include usernames and user IDs for such communication options such as IP messaging. A given entity can have a set of originating identifier options. An entity of the communication platform can be an account, sub-account, application, service, or other suitable entity scope. An entity can preferably be substantially permanently allocated one or more originating identifier. An entity may additionally be allocated a temporary originating endpoint or a shared/communal originating endpoint. For example, an account can have a set of fifty different possible originating phone numbers across a variety of country codes and area codes. As described below in the phone management variation, the different originating identifiers additionally provide other routing options.

Block S120, which includes receiving a communication request, functions to obtain an instruction for sending or establishing an outbound communication. The communication request is preferably received at a communication service, which can be a server or machine that establishes a communication or at least direct a secondary service to establish a communication. The communication service may be specifically configured for a particular medium or mode of communication such as Public Switch Telephone Network (PSTN) calls, Session Initiation Protocol (SIP) voice or video calls, Short Message Service (SMS) messages, Multimedia Messaging Service (MMS) messages, IP based messaging, push notifications, proprietary communication protocols, and/or any suitable communication medium. The communication service may be used for a plurality of communication mediums. A communication request is preferably associated with some form of entity or account, which can have an authentication process to verify that the request is legitimate. Additionally, an account or other suitable entity may have a permissions policy that can regulate the type and manner of communication requests.

A communication request can include communication properties, which can include at least one destination endpoint, optionally one or more originating endpoints, communication content, and/or other properties of the communication. The communication request can additionally define control directives as constraint properties such as, TTL constraints, receipt confirmation activation, feedback confirmation activation, communication mode restrictions, a max price parameter, a quality limit, and/or other properties used to gate or control communication.

The combination of properties defined in the communication request preferably defines communication intent expressed through a single message request. As opposed to specific communication instructions (e.g., send a SMS message to this endpoint originating from this endpoint and then send a second SMS message to this other endpoint at this endpoint at a later instance), the communication request can include intended communication content that indicates generalized objectives of the communication. In the diverse communication field, there are a wide variety of limitations and restrictions depending on the mode of communication, the particular telecommunication scarier, geographic region, content, and other features. A request of communication intent includes the high-level objective and is transformed into an executed process that automatically negotiates the challenges of fulfilling such a request.

The intended communication content can specify raw message content or medium of communication. In the case of asynchronous communication, the request of communication intent can include content intended for delivery and the intended destination entity. The final form of the content, whether the transmitted content is text, a graphic, a video, a link to an external resource, an audio message, and/or any suitable medium is not exclusively determined through the request as long as the content is delivered. Similarly, the exact destination endpoint may not be strictly defined as long as the message is delivered to the intended entity. In the case of synchronous communication, the mode of communication can similarly be generalized. The communication request can include a specified mode of communication, which can place limits on the suitable routing options. The possible modes can include a voice session mode (where synchronous audio should be transmitted between at least two endpoints), a video session mode (where video and/or audio should be transmitted between at least two endpoints), and synchronous message transmission mode (where text, images, videos, and/or other media can be delivered to a destination). A voice session mode can result in a voice session (e.g., PSTN or SIP based), a video session with only audio, or any synchronous form of communication through which audio can be transmitted. A video session can be a video session or alternatively downgraded to just audio. An asynchronous message transmission mode can result in any executed communication that transmits desired content. Synchronous communication mediums can similarly be used when in an asynchronous message transmission mode.

Upon receiving a communication request, at least a subset of information from the communication request is sent to the routing service. Preferably, the subset of information sent to the routing service is sent in the form of a routing request. The subset of information includes communication properties specified in the communication request of block Sno. Additionally, at least a subset of information from the communication request may be sent to a communication cost service. Preferably, the subset of information is sent to the communication cost service in the form of a cost request. The routing request and the cost request preferably include at least the destination of the communication. The routing request and/or cost request may additionally or alternatively include content of the communication, account information for the entity sending the communication request, the originating endpoint, the mode or medium of communication, and/or any suitable information. The routing request and the cost request are preferably sent in parallel but may alternatively be sent sequentially or in any suitable manner. The routing request and the cost request can be independent in that how a communication is routed and the attributed costs of that communication do not directly rely on each other. One expected benefit is that the quality of communication can be increased while simulating a simplified cost model to user accounts. As described below, a maximum cost parameter specified in a communication request can be accommodated after initially fulfilling the requests.

In one variation, the communication properties include a specified transport mode of communication. The specified transport mode can be a set of modes of communication permitted and/or blocked for the communication request. The set of operational transport modes can include a synchronous voice session mode of communication, a synchronous video session mode of communication, an asynchronous message transmission mode of communication and/or specific permitted/prohibited transport protocols (e.g., SMS, MMS, push, etc.). A specified transport mode can restrict, modify, or otherwise impact the selection of routing options.

In the communication campaign variation, Block S120 can include receiving a messaging request that includes communication intent parameters and a set of communication destinations S122. The set of communication destinations may be defined as abstract destination entities, which are then mapped to a destination endpoint depending on the selected communication routing option. For example, the destination endpoint could be a username, which may have a telephone number associated with SMS, MMS, and voice routing options and an username associated with an IP messaging service. However, the set of communication destinations more commonly will be a defined set of phone numbers. A communication request with a set of destination phone numbers will preferably have the communication content (or some suitable transformed form of the communication content) delivered to that set of destination phone numbers. Companies wanting to talk to a large number of people at once with a generic message or media can use express corresponding intent in the request.

Block S130, which includes selecting routing option, functions to determine a routing option of a communication. The communication request is preferably processed through a sequence of heuristics that can be used to select appropriate routing option. Selecting a routing option can include identifying one or more routing options capable of completing the communication request and identified according to a priority heuristic. In one variation, a single routing option is selected. In an alternative embodiment, a priority list of routing options is generated, and a routing option is selected from the list. The routing option is more specifically capable of completing the communication to a communication endpoint mapped to the specified destination endpoint. The specified endpoint may not be the receiving endpoint. A secondary endpoint associated with the specified endpoint may be targeted. For example, if a phone number is specified, but IP based messaging is instead used to communication with a username endpoint, wherein the user of the phone number operates the username endpoint. In the variation where the set of routing options is limited to a single communication protocol, Block S130 may be optional or used in selecting specific routing options within that single communication protocol such as which telecommunications carrier to use.

In querying routing options, the intended communication content can be analyzed to identify suitable transport protocols. The routing options of suitable transport protocols can then be filtered according destination endpoint and intended content and/or intended mode of communication. A destination can be identified as including an associated carrier, a country/regional location property, and/or device capabilities. Routing options having been reduced to routings options capable of communication intended content and capable of delivering to the intended destination can then be further filtered according to availability. Some routing options can be suffering from down time or quality issues at any given time—such routing options are preferably not considered for selection.

Selection heuristics can consider many factors. The heuristics can consider content and mode of communication of a routing option, reliability of a routing option, feature capability of a routing option, urgency compliant features, price of communication, user presence information, user preference of communication, user history of communication, originating endpoint communication limits, and/or any suitable factor that impacts an appropriate routing option.

A first heuristic can give weight to a routing option based on the involved content transformations. Different transport protocols can be given different preference depending on the original form of content. For example, sending a text message would give preference to a routing option involving an SMS with text over a routing option involving transforming the text to text-to-speech audio and playing over a PSTN phone call. The medium of intended content is preferably preserved, but the medium of content can be transformed depending on available routing options and/or other heuristic priorities.

A second heuristic can give weight to routing options according to quality scores, reliability, communication confirmation, and other suitable reliability and urgency compliance features. In one variation, a communication request can be accompanied by a TTL limit. The TTL limit can define a time window in which a message is delivered. Different routing options can have varying time to delivery predictions, and the routing option can be selected to satisfy the TTL restriction. In one variation, the TTL may be acted upon by selecting a routing option that better fulfills the TTL time restriction. In another variation, the TTL is used to select the originating identifier and scheduling of transmissions. SMS and MMS messaging have limits on the number of unique recipients in a day for a given phone number. SMS and MMS messaging additionally have limits on the messaging throughput rate (e.g., number of messages per second). If an account were to try to send a thousand messages in thirty minutes from a single number, most of those communications would fail due to limiting of communication.

Additionally, a communication request can include different confirmation requirements. A request may specify that an acknowledgment confirm the message was transmitted successfully or similarly that the message was read by the end user. Different transport protocols will have varying capabilities or mechanisms to provide such verification or acknowledgment. If a requested feature is not supported by a routing option, that routing option may not be considered. Similarly, the type of selected routing option may determine the type of content transformation to complete the confirmation. For example, sending an SMS or MMS message with interaction feedback may result in conversion of a link and/or a media file into a tracking link.

A third heuristic can give weight to routing options that have not satisfied a communication quota or contractual obligation. A quota can be set for a time frame, and a routing option has the target of satisfying the quota in that time frame. For example, an SMS routing option can have a quota of five thousand messages in a month. Selection of a routing option within a priority list or prioritization within the list can be based on satisfying the quota. For example, a routing option further from a quota can be prioritized above a routing option that has satisfied a quota, surpassed a quota, or does not include a quota. Additionally, a quota can be weighted to indicate importance of the quota. For example, some routing options may have a more important quota goal (e.g., a routing option will be cancelled by a carrier), and other routing options may have less important quota goal (e.g., special discounting pricing isn't provided if not satisfied). Various rules and properties can be encoded into a routing option to facilitate relative prioritization/selection of routing options. One exemplary use of a quota includes a routing option using a particular network carrier that was negotiated at an internal cost rate that has a minimum number of communications that should be met. Another exemplary use of a quota may include regulating a routing option with a rate limit of SMS messages sent in a minute allowed over a network carrier of a second routing option.

A fourth heuristic can give weight to routing options with lower internal cost (e.g., payment to outside partners and/or operational cost). A related heuristic can include calculating effective internal cost of a routing option. The effective internal cost is the predicted cost to the communication cost to the platform. In some cases, communicating over a first transport protocol has different communication limits compared to a second transport protocol and as a result a routing option of the first transport protocol may require transmitting the intended content in one form (e.g., in a single message) and the routing option of the second transport protocol may require transmitting the intended content in a second form (e.g., split into two or more messages). The effective internal cost can be the number of messages to transmit the intended content multiplied by the internal cost of an individual message transmitted on the routing option. The cost can be a financial cost and is frequently dependent on the specific routing option. The difference between the communication cost and the effective internal cost can be the profit of the platform for an individual communication. The priority heuristic is preferably in place to increase profits across a plurality of communications.

A fifth heuristic can give weight to routing options with particular feature capabilities (e.g., message confirmation, no message size restrictions, multimedia support). A feature heuristic can be enforced if specified content specifies a desired delivered format.

A sixth heuristic can consider presence information of the destination. A presence service can be integrated into the platform and provide availability of a user across multiple devices and/or protocols. For example, a user maybe accessible through a phone voice session, SMS and MMS on the phone, push notifications on the phone, and through an IP protocol of an application on a second browser device.

Presence information can indicate if any of those channels are active, prioritization/preference of the channels.

A seventh heuristic can consider communication history and/or destination preference. Preference of a destination can be inferred from communication. Modes of communication used to initiate outbound communication from an endpoint can be considered indicators of user preference. Alternatively, a user profile can be configured with prioritization of endpoints and/or protocols.

These factors and other suitable prioritization factors can be combined in any suitable manner to form a prioritization heuristic used in ranking routing options.

Block S140, which includes transforming content of the communication request to a compatible form of the selected routing option, functions to convert media content of the communication to a format suitable for transmitting. In asynchronous communication, the content is converted and then transmitted to the destination. In synchronous communication, the content can be transcoded and streamed to a destination such that the content/medium is generated in substantially real-time with the communication session. The form of the transformation is determined based on the originating format of the communication content and the selected routing option. If the routing option is the same as the originating transport protocol, transformation of content may be skipped. Transformation can include translating to a text form, generating a URI link to the content, replacing a URI or media file with a tracking URI, generating an audio version of the content, generating a video version of the content, satisfying protocol restrictions (e.g., character limits, file size limits, encoding, and the like), segmenting into multiple messages, grouping multiple content into a single object, supplying unspecified metadata, and/or making any suitable transformation. Exemplary transformations may include SMS to MMS, MMS to SMS, SMS/MMS to IP push/proprietary IP/client application, SMS/MMS to email/fax, fax/email to SMS/MMS, IP messaging to SMS/MMS, Voice to SMS, Voice to MMS, SMS to voice, Voice to video, Video to voice, and/or any suitable form of transformation.

Block S150, which includes transmitting content to a destination endpoint on the selected routing option, functions to establish or execute the communication. The communication is preferably implemented on the selected routing option using the transformed content. In some variations, communication confirmation of delivery or of reading can be requested. The delivery and reading request can be fulfilled through the transport protocol of the selected routing option. As shown in FIG. 11, an urgency parameter can specify that a receipt acknowledgment be made. Subsequent communications in asynchronous and synchronous forms of communication can be processed to select an appropriate routing option, optionally using communication history to influence routing option selection. In asynchronous communication (e.g., messaging), responses can be received from the delivery endpoint. A similar process can be invoked to determine the route used to deliver the response as shown in FIGURE n, but alternatively, a routing option of the communication that prompted the initial communication response can be used. In synchronous communication, the destination endpoint can be bridged with the originating endpoint.

Figure 13:
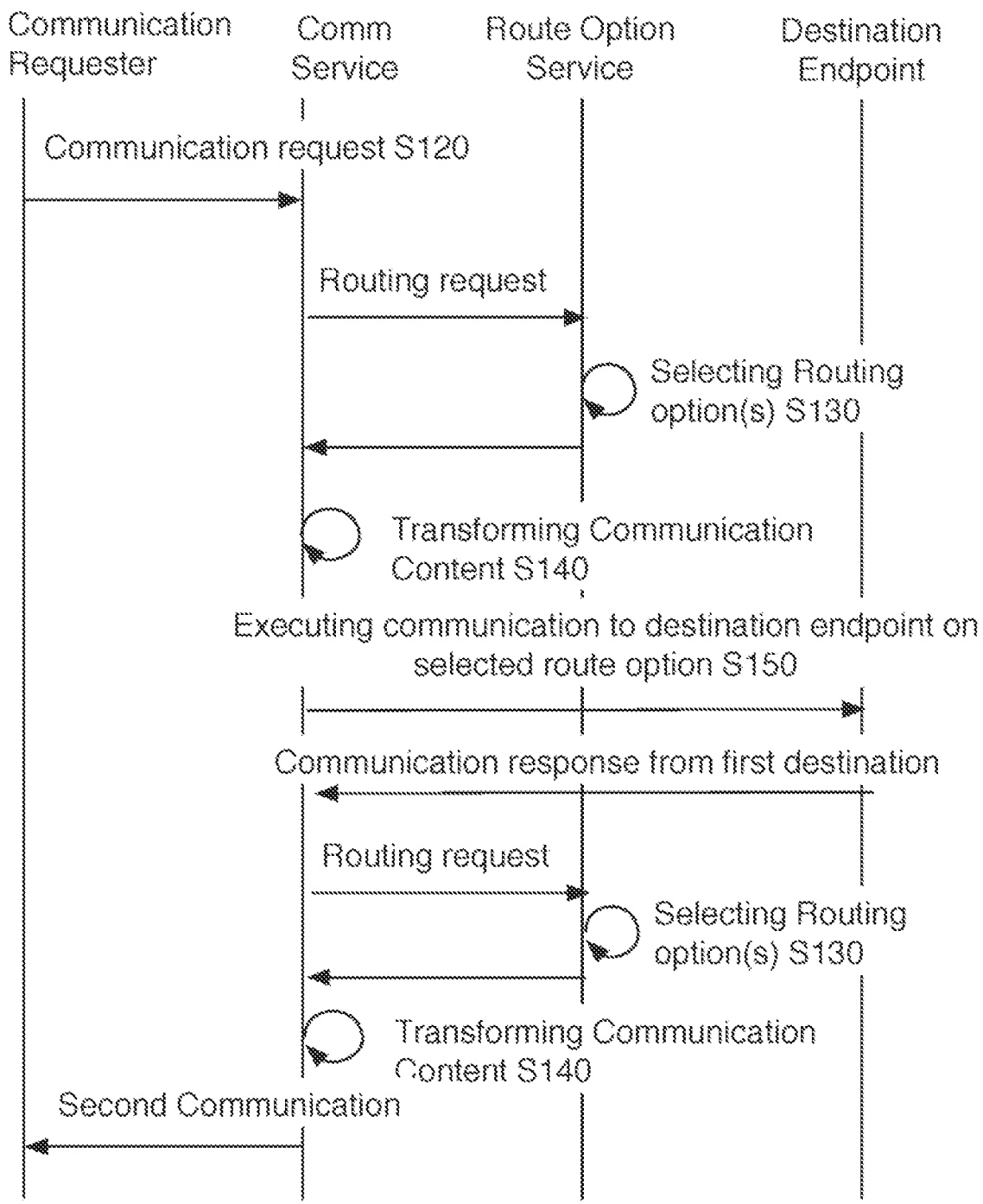
FIG. 13 is a communication flow diagram of a method translating between two communication modes.

As shown in FIG. 13, the method can be similarly applied to responses from a destination endpoint. In this variation, an incoming communication is interpreted as a communication request. Accordingly, the method can translate between one or more communication modes.

As shown in FIG. 8, the method of applying communication intent to a communication campaign of a set of destinations preferably includes dynamically transforming message transmissions to the communication destinations according to individual communication destinations S200. Block S200 functions to iteratively execute dynamic multi-modal communication as described above for Blocks S130, S140, and S150 wherein those processes are applied to a set of phone numbers. Block S200 may be used to dynamically transform message transmissions in parallel, in series, according to a coordinated schedule, or in any suitable manner. Block S200 preferably includes for each communication destination in the set of destinations: selecting a communication mode according to the communication intent parameters S230, transforming content of communication request S240, and transmitting transformed content to a destination endpoint in the selected communication mode S250. Block S230, S240, and S250 can be substantially similar to Blocks S130, S140, and S150 respectively but may additionally or alternatively include the variations described below. When processing a communication campaign, Block S200 preferably employs the origin identifier selection process as described herein to balance across multiple origin endpoints and/or achieve targeted origin proximity to a destination endpoint. Block S200 may additionally include or be applied towards tracking communication interactions through trackable URIs.

Block S230, which includes selecting a communication mode according to the communication intent parameters, functions to select how each transmitted communication is communicated. Each destination endpoint may have different capabilities. The method may include querying an endpoint information service to determine the set of capabilities, preferences, history, and other suitable factors that can impact communicating with a destination. As one aspect, the communication mode can include selecting the origin identifier of an account used as the calling entity for a transmission. When executing a telephony campaign, some endpoints may have communication mode of MMS, another subset will be assigned a communication mode of SMS, and still another subset may be assigned a communication mode of IP messaging. Selecting a communication mode may use any of the heuristics described above.

Block S240, which includes transforming content of communication request, functions to transform the content. As described above, this may depend on the selected communication mode, which is further dependent on the destination endpoint. As with the communication mode, the form of transformation can be customized for each destination endpoint. The actual form of content between two destination endpoints may be different. For example, one may receive actual image content while another receives a link to a hosted image. However, the objective of the communication request is preferably achieved in both by communicating the image to the end user. Transforming content of communication request may include transforming communication content to include a trackable link to monitor and report on interactions with the communication. A trackable link is preferably a URI, URL or any suitable resource reference that routes access to a controlled resource of the communication platform (or another cooperative resource). The controlled resource preferably monitors access and provides access to desired content. The trackable link can be in the form of a URL shortening service automatically or electively invoked on links in a communication. The trackable link can be a redirection link for a URL, where a user initially accesses the trackable URI, the access is recorded, and then the user is redirected to the original URL The trackable link can additionally be used for media files or application references. When accessing a trackable link of an image, the image may be hosted by the communication platform at the trackable link.

Block S250, which includes transmitting transformed content to a destination endpoint in the selected communication mode, functions to transmit each customized communication to the destination. Transmitting the transformed content for each destination endpoint will result in the transmission of a set of communications. The transmissions can be performed in series, parallel, and/or at any suitable intervals. Preferably the transmission schedule is determined based on the phone number selection process.

As shown in FIG. 9, the method may include balancing transmissions across a set of origin identifiers S300, which functions to distribute a set of communications across multiple origin endpoints of an account (or application, service, or other suitable entity scope). More practically, the method variation of S300 functions to abstract away the complications of dealing with communication volume limits and to use multiple communication endpoints to achieve message volume within a defined time window. The origin identifiers are preferably telecommunication endpoints and more specifically phone numbers. The phone numbers are preferably allocated to an account but at least a subset may alternatively be temporarily allocated to the account or shared between with one or more distinct accounts. Balancing transmissions across a set of origin identifiers may include detecting a condition for transmitting across multiple endpoints S310, allocating originating endpoints S320, selecting originating endpoints from which to transmit the set of communications S330, scheduling transmissions across the selected originating endpoints S340, and/or transmitting the communications according to a schedule of transmissions S350.

Block S310, which includes detecting a condition for transmitting across multiple endpoints, functions to determine the conditions for balancing transmissions across multiple origin endpoints. Multiple endpoints are used when multiple messages need to be sent and there is some implicit or explicit expectation of time of communication. Transmitting across multiple endpoints is preferably performed for SMS and MMS messages that have daily limits on unique recipients and message per second throughput limit. Detecting a condition for transmitting across multiple endpoints can be automatic. In one situation, the communication platform may automatically balance communications across the full set of origin endpoints of an account to achieve increased transmission throughput by the account. Alternatively, the system may default to sending at a rate that avoids straining the system and does not require allocation of new origin endpoints (i.e., doesn't violate limits). In the case where an account has a single origin endpoint and there is no other constraint, there is no balancing across endpoints and transmissions are executed so as to not strain the system and not violate the messaging limits of that endpoints.

In another variation, the communication request specifies a set of origin endpoints. The set of origin endpoints is preferably used, and the transmission throughput may be based on the number of specified origin endpoints.

In another variation, the communication request specifies a TTL, which will set a timing constraint. That timing constraint will set a target throughput for communicating with the set of destination endpoints. In some variations, the number of origin endpoints available to an account is insufficient to achieve the TTL. If the TTL cannot be achieved Block S320 may allocate endpoints to the account so that the time constraint can be satisfied. Detecting a condition for transmitting across multiple endpoints may additionally include detecting number of endpoints to fulfill a timing condition. The number of endpoints may be determined after determining the communication mode for the set of destination endpoints because the mixture of communication modes may change the endpoint number requirements. For example, destination entities reached over IP messaging can reduce the number of telephone numbers.

Figure 10:
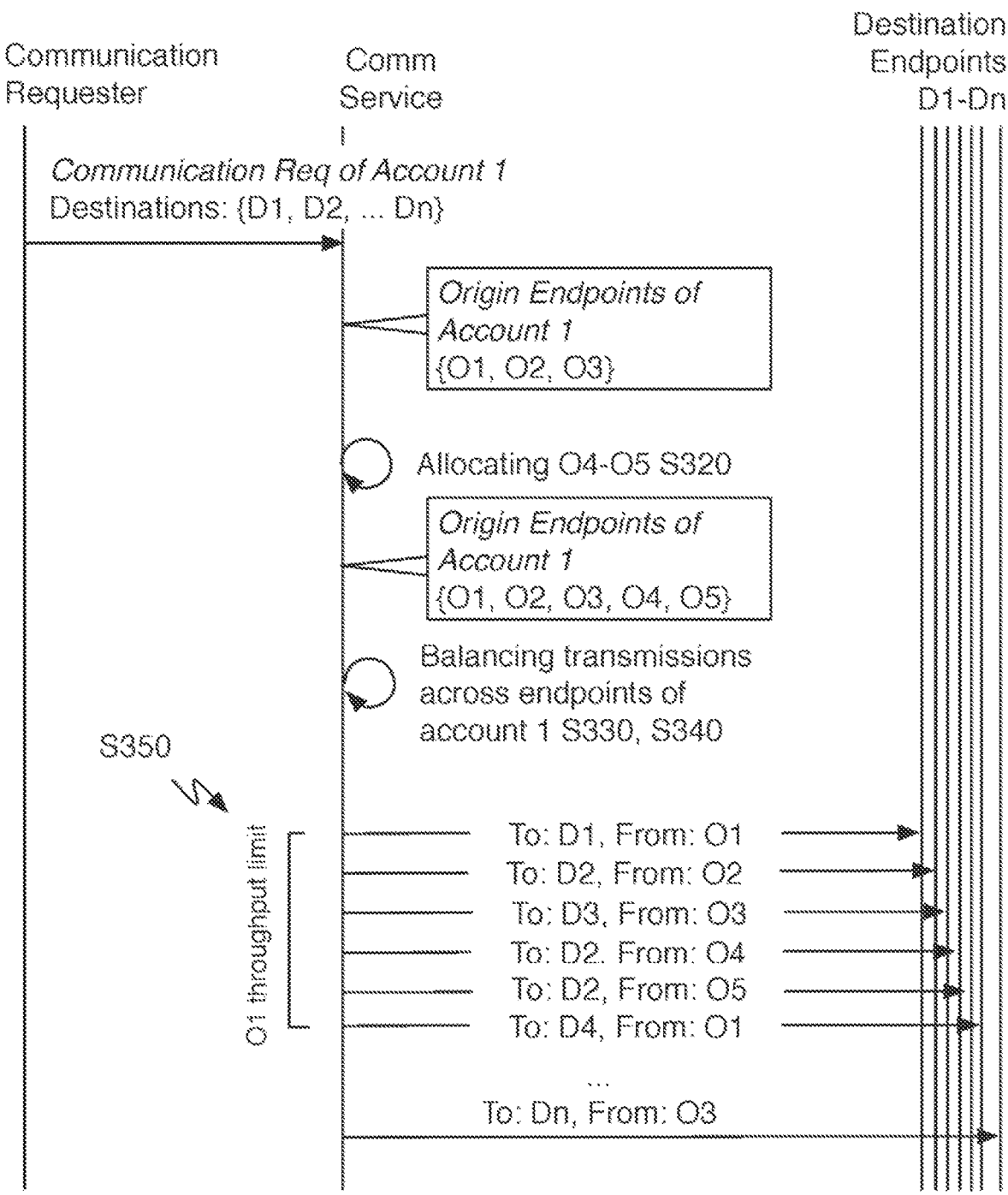
FIG. 10 is a communication flow diagram of a variation of balancing transmissions across a set of origin identifiers and allocating origin endpoints.

Block S320, which includes allocating originating endpoints, functions to assign use of a phone number to a platform entity as shown in FIG. 10. Allocating originating endpoints is preferably used when the account has insufficient origin endpoints to satisfy a constraint (e.g., not enough phone numbers to transmit all the messages in the designated time window). Herein accounts are used as the preferred entity, but an endpoint may alternatively be allocated for an application service, sub-account, or other entity. Allocating an originating endpoint preferably assigned or registers an endpoint for that account such that the account can make outgoing communications from that endpoint. The communication platform may have a number of endpoints that can be assigned for account usage. Alternatively, endpoints may be ported into the communication platform and then assigned for account usage. As allocating endpoints may take some time, such as if endpoints are ported into the system, then there may be a delay before a communication campaign can be executed. However, a communication campaign could pre-emptively plan or schedule a communication. Alternatively, an account could use an interface to pre-emptively set up an account to execute campaigns. In one example, an account administrator would use a web portal to setup a "campaign" which may have the destination endpoints, the time constraints and other factors. It may or may not specify the communication content. Phone number allocation may be part of the process of setting up a campaign. Once an account has created a campaign model, the account can make a request to send set communication content for that campaign. The request includes the destination endpoints through a reference to the identifier of the campaign.

Figure 14:
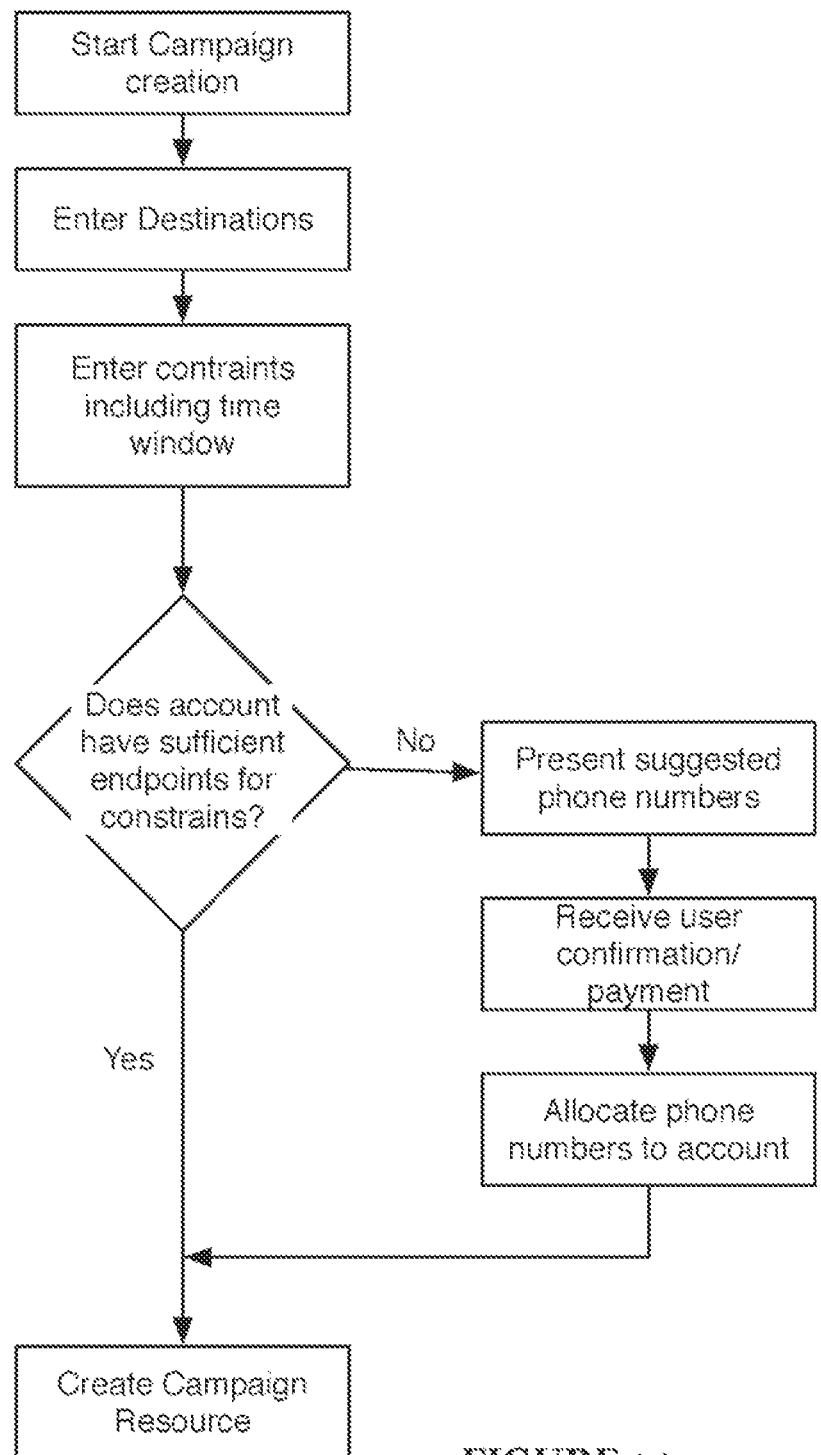
FIGS. 14 and 15 are flow diagrams of a variation using a campaign resource.
Figure 15:
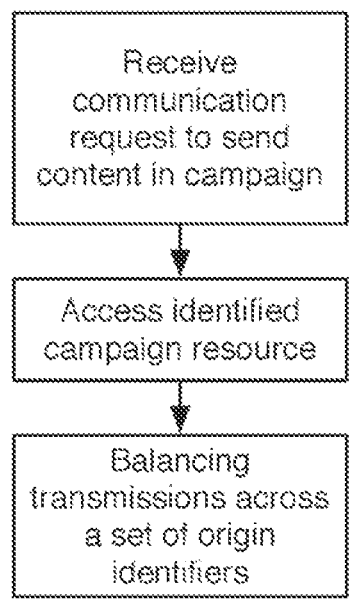

In some cases, allocating numbers may require payment for those numbers in which case, allocation may require user approval. In one variation, as shown in FIGS. 14 and 15, a campaign resource can be pre-emptively configured with a set of endpoints and any constraint properties such as TTL time windows where the communication is automatically balanced over multiple origin endpoints. Pre-emptively creating the campaign resource may be used to provide confirmation of allocating new origin endpoints. Once the campaign resource is created, communication requests can specify the campaign identifier to define the destinations and timing as shown in FIG. 15. In one example, a user sets up a messaging campaign through a user interface, before initiating the campaign, the user interface prompts the user for timing constraints and will show the number of phone numbers allocated to satisfy a selected constraint. Approval of the messaging campaign may be dependent on approval or payment for allocation of new endpoints, as shown in FIG. 14. In another variation, the approval is achieved through a programmatic request and response model. For example, an application requests a communication with a time constraint. The account for the application has insufficient managed endpoints to complete the communications in the time constraint—an error or warning response is transmitted to the application. The application can approve or initiate the allocation of sufficient endpoints to complete the communication request. In another variation, the communication intent will include a budget constraint. The budget constraint may be explicitly set in a parameter of the communication request, but may alternatively be expressed through pre-paid credit in the account. If the budget allows for allocation, the phone numbers may be automatically allocated to the account and then used in transmission of the communications. The allocation preferences for an account may alternatively be set or expressed through any suitable mechanism.

Figure 16:
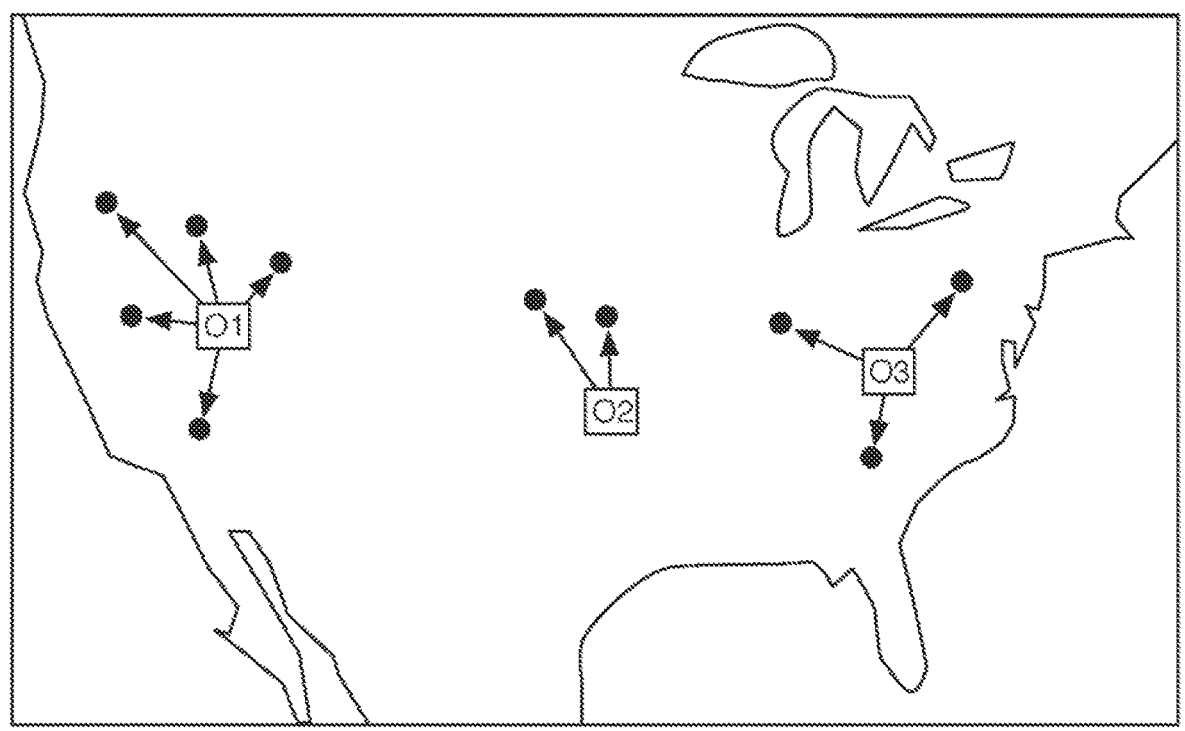
FIG. 16 is a graphical representation of origin endpoints selected according to regional association.

Block S330, which includes selecting originating endpoints from which to transmit the set of communications, functions to determine the mapping between origin endpoints and destination endpoints. An origin endpoint can preferably handle transmitting messages to multiple destinations no greater than the throughput limit. If the throughput limit for any given endpoint is 1 message per second and the TTL time constraint is 30 minutes then a single origin endpoint can theoretically send approximately 1800 messages. Selecting of the originating endpoints can include selecting endpoints at least in part based on the regional relationship between the originating endpoint and the destination endpoints as shown in FIG. 16. For example, origin endpoints from the same country and/or area code of a destination endpoint may be prioritized as a pairing. Selecting an originating endpoint may be pre-planned before beginning transmission, but it may alternatively be on-demand as the set of communications are dequeued from some awaiting transmission queue. The selection of originating endpoints may alternatively be executed in any suitable manner.

Block S340, which includes scheduling transmissions across the selected originating endpoints, functions to set the rate or timing of transmissions. The transmission of messages is preferably distributed over a time window. In some cases, the time window may require executing the transmissions at an optimized rate, where the origin endpoints transmit the messages at approximately the throughput limit of the endpoints. In other cases, the time window is sufficiently long that they can be distributed so as to satisfy but the time window constraint but without sending them at a maximum speed.

Block S350, which includes transmitting the communications according to a schedule of transmissions, functions to send the communications. The set of origin endpoints will preferably transmit communications in parallel. But transmission can be choreographed in any suitable manner.

Figure 17:
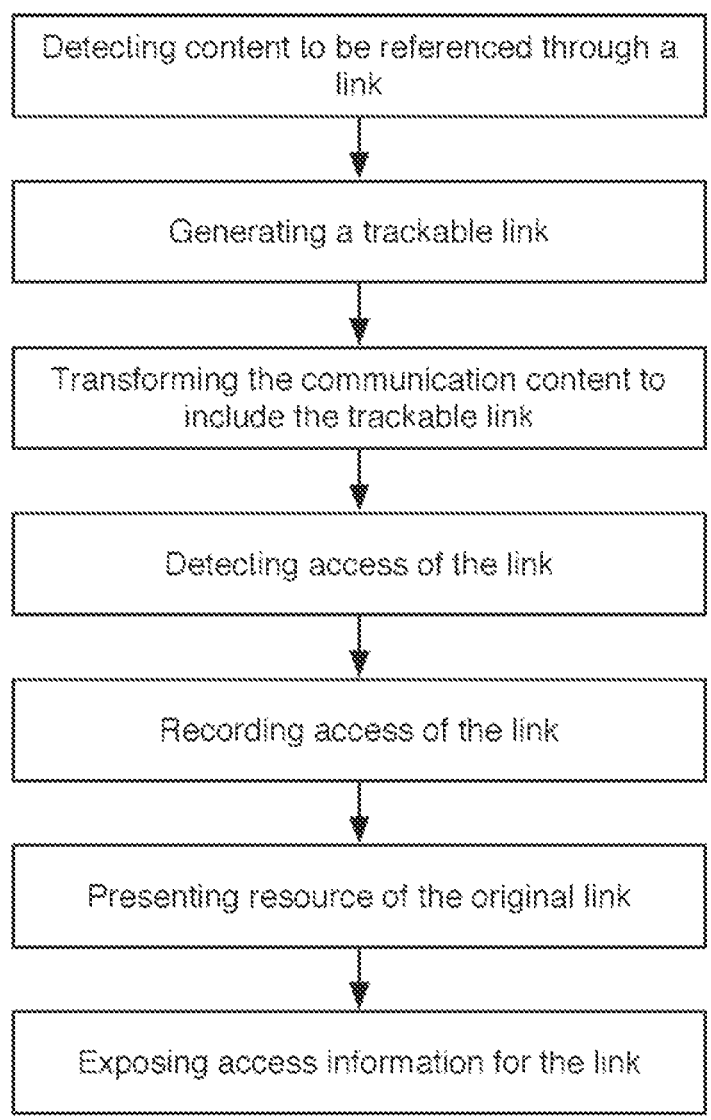
FIG. 17 is a flowchart representation of a method variation of capturing communication interactions through trackable links.

As shown in FIG. 17, the method may include capturing communication interactions through trackable links S400, which functions to apply content transformation within a campaign to monitor impact and results of the campaign. Through Block S400, the number of users that access content can at least partially be monitored. Block S400 can be used to create a campaign analytics dashboard wherein different communication campaigns can be compared. With the data collected through Block S400, an account manager can view data on when and where people interacted with a communication (e.g., viewed a communication or clicked a link to access referenced content). Block S400 may alternatively be used for data driven optimization of communication campaigns by evaluating different forms of content and automatically selecting different content options to improve interaction results.

Block S400 preferably includes detecting content to be referenced through a link, generating a trackable link, transforming the communication content to include the trackable link, detect access of the link, record access of the link, present resource of the original link (either redirecting or rendering a hosted version), and exposing access information for the link which may include exposing access information across the set of links (for a given communication request, campaign, account or any suitable scope).

The content to be referenced through a link, such as media, images, video, audio, multimedia, and text, may be removed from the communication and instead delivered through the communication as a trackable link. A user will have to access the link to view the media. In another variation, the content is an original URI that forms part of the communication content. Other forms of content may be pin codes or other communication portions that can may warrant interaction by a user to access.

The trackable link is preferably a shortened URL but can be any suitable URI. The trackable URI references a resource controlled by the communication platform such that accessing the link initially directs an application layer request (e.g., HTTP, HTTPS, SPDY, etc.) to the controlled resource (e.g., a server of the telecommunications platform). If the trackable URI was a proxy for an original URI, then the trackable URI redirects the application layer request to the original URI. If the trackable URI is to a media object, that media object may be hosted by the controlled resource, and the user is not redirected elsewhere.

Capturing communication interactions through trackable links can be used during a communication campaign to multiple destination endpoints. The account requesting the communication campaign can provide the communication in a base single instance format, and the communication platform automatically generates unique trackable links for the set of destination endpoints. When applied, a first recipient might receive a text message but with a URI unique to them and a second recipient might receive a substantially identical text message but with a second URI that is unique to the second recipient. Access to the trackable links is monitored across recipients. Access data exposed to an associated account can include detailed logs of what users access the link and when, regional statistics (e.g., click rate based on state), overall statistics (e.g., conversion rate, etc.), and other suitable analytics. Access data can be exposed as API resources, as information conveyed through a user interface, or as a programmatic notification. In one variation, when a trackable link is accessed, the communication platform detects the access event and then can issue a callback event to a pre-configured callback URI. Preferably an account will pre-emptively configure a callback URI, which functions as a URI to an outside resource controlled by the account. The callback URI is preferably hosted by an application server of the account owner and can be configured to perform any suitable action when receiving a callback communication. For example, when a user of a destination clicks a tracking link, a server of the communication platform will detect the access. The communication platform can then submit an HTTP POST or GET request to the configured callback URI (or any suitable application layer protocol communication such as HTTPs or SPDY) along with any suitable metadata (such as time of access, client information gathered from the access event, etc.). The server of the callback URI can then perform any suitable logic such as update a database or send another communication to the user.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the communication system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
receiving, by a multi-tenant communication platform, a first request associated with a first user account and a second request associated with a second user account,
the first request comprising content of a first message and a first plurality of destination endpoints to receive the first message, and identifying a first routing property defining one or more first constraints for transmitting the first message, and
the second request comprising content of a second message and a second plurality of destination endpoints to receive the second message, and identifying a second routing property defining one or more second constraints for transmitting the second message;
generating a first list of routing options for delivering the first message to the first plurality of destination endpoints using the first routing property, and a second list of routing options for delivering the second message to the second plurality of destination endpoints using the second routing property, the routing options being associated with different communication services and, for each communication service, different channel protocols corresponding to different service providers;
determining, based on the first list of routing options, a first optimal routing option for delivering the first message to the first plurality of destination endpoints;
determining, based on the second list of routing options, a second optimal routing option for delivering the second message to the second plurality of destination endpoints;
causing one or more versions of the first message to be transmitted to the first plurality of destination endpoints using the first optimal routing option; and
causing one or more versions of the second message to be transmitted to the second plurality of destination endpoints using the second optimal routing option.

2. The method of claim 1, further comprising:
providing, for presentation to the first user account, first access rate statistics collected by tracking access to the one or more versions of the first message by the first plurality of destination endpoints; and
providing, for presentation to the second user account, second access rate statistics collected by tracking access to the one or more versions of the second message by the second plurality of destination endpoints.

3. The method of claim 1, wherein each of the one or more versions of the first message corresponds to at least one routing operation in the first list of routing options, and each of the one or more versions of the second message corresponds to at least one routing operation in the second list of routing options.

4. The method of claim 1, wherein:
the one or more first constraints comprise at least one of a first quality score and a first maximum transmission cost for the first list of routing options;
the one or more second constraints comprise at least one of a second quality score and a second maximum transmission cost for the second list of routing options;
the first quality score defines a limit on a measured quality level for the first list of routing options, and the first maximum transmission cost defines a maximum cost for transmitting the first message for the first list of routing options; and
the second quality score defines a limit on a measured quality level for the second list of routing options, and the second maximum transmission cost defines a maximum cost for transmitting the second message for the second list of routing options.

5. The method of claim 1, further comprising:
generating the one or more versions of the first message by converting a first resource link into a first unique trackable resource link; and
generating the one or more versions of the second message by converting a second resource link into a second unique trackable resource link.

6. The method of claim 1, wherein the first list of routing options and the second list of routing options are generated using priority heuristic rules.

7. The method of claim 6, wherein the priority heuristic rules are based on one or more of:
content and mode of communication of a routing option,
reliability of a routing option, feature capability of a routing option,
urgency compliant features,
price of communication,
user presence information,
user preference of communication,
user history of communication, or
originating endpoint communication limits.

8. The method of claim 6, wherein the priority heuristic rules comprise at least one of:
a first heuristic rule to give weight to a routing option that is based on content transformations,
a second heuristic rule to give weight to routing options according to one or more of quality scores, reliability, communication confirmation, reliability, or urgency compliance features,
a third heuristic rule to give weight to routing options that have not satisfied a communication quota or contractual obligation,
a fourth heuristic rule to give weight to routing options with lower internal costs,
a fifth heuristic rule to give weight to routing options with particular feature capabilities,
a sixth heuristic rule to consider presence information of a destination endpoint, or
a seventh heuristic rule to consider at least one of communication history or destination preference.

9. A system comprising:
a memory; and
one or more processors, coupled to the memory, to perform operations comprising:
receiving, by a multi-tenant communication platform, a first request associated with a first user account and a second request associated with a second user account,
the first request comprising content of a first message and a first plurality of destination endpoints to receive the first message, and identifying a first routing property defining one or more first constraints for transmitting the first message, and
the second request comprising content of a second message and a second plurality of destination endpoints to receive the second message, and identifying a second routing property defining one or more second constraints for transmitting the second message;
generating a first list of routing options for delivering the first message to the first plurality of destination endpoints using the first routing property, and a second list of routing options for delivering the second message to the second plurality of destination endpoints using the second routing property, the routing options being associated with different communication services and, for each communication service, different channel protocols corresponding to different service providers;
determining, based on the first list of routing options, a first optimal routing option for delivering the first message to the first plurality of destination endpoints;
determining, based on the second list of routing options, a second optimal routing option for delivering the second message to the second plurality of destination endpoints;
causing one or more versions of the first message to be transmitted to the first plurality of destination endpoints using the first optimal routing option; and
causing one or more versions of the second message to be transmitted to the second plurality of destination endpoints using the second optimal routing option.

10. The system of claim 9, the operations further comprising:
providing, for presentation to the first user account, first access rate statistics collected by tracking access to the one or more versions of the first message by the first plurality of destination endpoints; and
providing, for presentation to the second user account, second access rate statistics collected by tracking access to the one or more versions of the second message by the second plurality of destination endpoints.

11. The system of claim 9, wherein each of the one or more versions of the first message corresponds to at least one routing operation in the first list of routing options, and each of the one or more versions of the second message corresponds to at least one routing operation in the second list of routing options.

12. The system of claim 9, wherein:
the one or more first constraints comprise at least one of a first quality score and a first maximum transmission cost for the first list of routing options;
the one or more second constraints comprise at least one of a second quality score and a second maximum transmission cost for the second list of routing options;
the first quality score defines a limit on a measured quality level for the first list of routing options, and the first maximum transmission cost defines a maximum cost for transmitting the first message for the first list of routing options; and
the second quality score defines a limit on a measured quality level for the second list of routing options, and the second maximum transmission cost defines a maximum cost for transmitting the second message for the second list of routing options.

13. The system of claim 9, the operations further comprising:
generating the one or more versions of the first message by converting a first resource link into a first unique trackable resource link; and
generating the one or more versions of the second message by converting a second resource link into a second unique trackable resource link.

14. The system of claim 9, wherein the first list of routing options and the second list of routing options are generated using priority heuristic rules.

15. The system of claim 14, wherein the priority heuristic rules are based on one or more of:
content and mode of communication of a routing option,
reliability of a routing option, feature capability of a routing option,
urgency compliant features,
price of communication,
user presence information,
user preference of communication,
user history of communication, or
originating endpoint communication limits.

16. The system of claim 15, wherein the priority heuristic rules comprise at least one of:
a first heuristic rule to give weight to a routing option that is based on content transformations,
a second heuristic rule to give weight to routing options according to one or more of quality scores, reliability, communication confirmation, reliability, or urgency compliance features,
a third heuristic rule to give weight to routing options that have not satisfied a communication quota or contractual obligation,
a fourth heuristic rule to give weight to routing options with lower internal costs,
a fifth heuristic rule to give weight to routing options with particular feature capabilities,
a sixth heuristic rule to consider presence information of a destination endpoint, or
a seventh heuristic rule to consider at least one of communication history or destination preference.

17. A non-transitory computer-readable medium storing instructions that, when executed by one or more computer processors of one or more computer devices, cause the one or more computing devices to perform operations comprising:
receiving, by a multi-tenant communication platform, a first request associated with a first user account and a second request associated with a second user account,
the first request comprising content of a first message and a first plurality of destination endpoints to receive the first message, and identifying a first routing property defining one or more first constraints for transmitting the first message, and
the second request comprising content of a second message and a second plurality of destination endpoints to receive the second message, and identifying a second routing property defining one or more second constraints for transmitting the second message;

generating a first list of routing options for delivering the first message to the first plurality of destination endpoints using the first routing property, and a second list of routing options for delivering the second message to the second plurality of destination endpoints using the second routing property, the routing options being associated with different communication services and, for each communication service, different channel protocols corresponding to different service providers;

determining, based on the first list of routing options, a first optimal routing option for delivering the first message to the first plurality of destination endpoints;

determining, based on the second list of routing options, a second optimal routing option for delivering the second message to the second plurality of destination endpoints;

causing one or more versions of the first message to be transmitted to the first plurality of destination endpoints using the first optimal routing option; and causing one or more versions of the second message to be transmitted to the second plurality of destination endpoints using the second optimal routing option.

18. The non-transitory computer-readable medium of claim 17, wherein the first list of routing options and the second list of routing options are generated using priority heuristic rules.

19. The non-transitory computer-readable medium of claim 18, wherein the priority heuristic rules are based on one or more of:

content and mode of communication of a routing option,
reliability of a routing option, feature capability of a routing option,
urgency compliant features,
price of communication,
user presence information,
user preference of communication,
user history of communication, or
originating endpoint communication limits.

20. The non-transitory computer-readable medium of claim 18, wherein the priority heuristic rules comprise at least one of:

a first heuristic rule to give weight to a routing option that is based on content transformations, a second heuristic rule to give weight to routing options according to one or more of quality scores, reliability, communication confirmation, reliability, or urgency compliance features, a third heuristic rule to give weight to routing options that have not satisfied a communication quota or contractual obligation, a fourth heuristic rule to give weight to routing options with lower internal costs, a fifth heuristic rule to give weight to routing options with particular feature capabilities, a sixth heuristic rule to consider presence information of a destination endpoint, or a seventh heuristic rule to consider at least one of communication history or destination preference.

* * * * *